US005768640A

United States Patent [19]
Takahashi et al.

[11] Patent Number: 5,768,640
[45] Date of Patent: Jun. 16, 1998

[54] CAMERA HAVING AN INFORMATION RECORDING FUNCTION

[75] Inventors: Yoshiharu Takahashi; Yoshiyuki Nojima; Yasutoshi Fujii; Noriyuki Kaedeoka; Takaichi Hayashida, all of Hachioji, Japan

[73] Assignee: Konica Corporation, Japan

[21] Appl. No.: 734,470

[22] Filed: Oct. 17, 1996

[30] Foreign Application Priority Data

| Oct. 27, 1995 | [JP] | Japan | 7-280485 |
| Oct. 27, 1995 | [JP] | Japan | 7-280486 |
| Mar. 27, 1996 | [JP] | Japan | 8-071941 |

[51] Int. Cl.$^6$ .................. G03B 17/24; G03B 29/00
[52] U.S. Cl. .................. 396/310; 396/429
[58] Field of Search .................. 396/310, 311, 396/312, 319, 320, 429, 434; 348/232, 233

[56] References Cited

U.S. PATENT DOCUMENTS

| 5,267,042 | 11/1993 | Tsuchiya et al. | 348/232 |
| 5,296,884 | 3/1994 | Honda et al. | 396/319 |
| 5,335,072 | 8/1994 | Tanaka et al. | 348/232 |
| 5,499,294 | 3/1996 | Friedman | 380/10 |
| 5,506,644 | 4/1996 | Suzuki et al. | 396/319 |

*Primary Examiner*—Safet Metjahic
*Assistant Examiner*—Nicholas J. Tuccillo
*Attorney, Agent, or Firm*—Jordan B. Bierman; Bierman, Muserlian and Lucas

[57] ABSTRACT

An apparatus for recording a photographed image on a recording medium together with information received from a satellite of GPS (Global Positioning System). The apparatus includes a first memory to store recording data on the recording medium; a second memory to store the information received thereafter by a GPS receiver; and a judging circuit for determining whether the later recording data is to be shifted from the second memory to the first memory when the shutter is actuated.

12 Claims, 20 Drawing Sheets

```
9503150512          3FD
N3540032            E13922214
```

```
9503150512          3FD    187
N3540032            E13922214
```

```
9503150512        3F
N3540035         E13922216
```

```
9503150513        4G
N3540036         E13922217
```

```
9503150513        4G    185
N3540036         E13922217
```

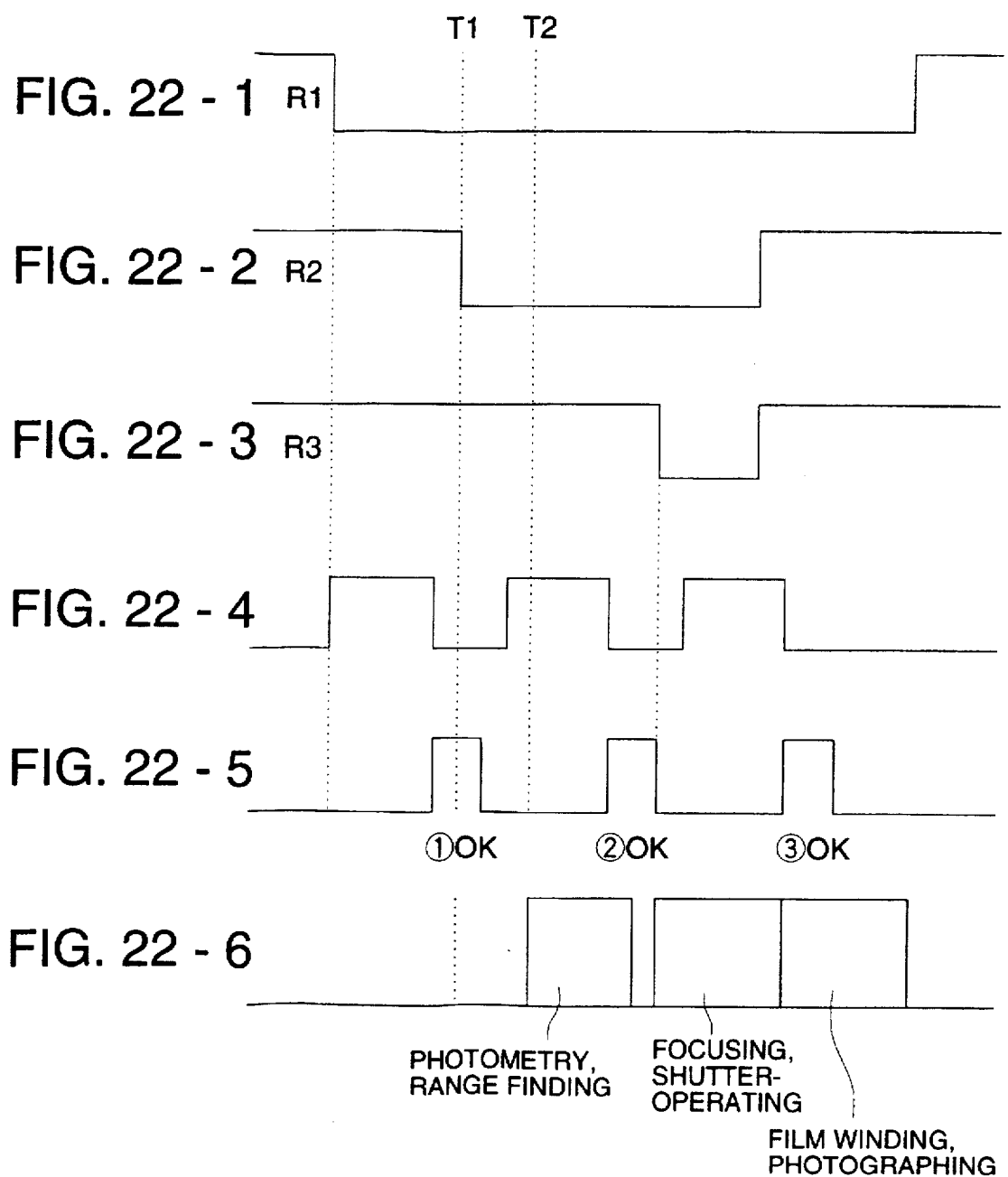

CAMERA HAVING AN INFORMATION RECORDING FUNCTION

BACKGROUND OF THE INVENTION

The present invention relates to a camera which records a photographed image and various kinds of information, and more specifically, to a camera which records related photographic condition information, such as time at a photographic position, or the like, together with a photographed image, into a recording medium by utilizing a Global Positioning System, (hereinafter, which is called GPS), which receives information transmitted from a GPS satellite, and searches the position of a receiver.

Recently, a camera has been proposed, which receives data of latitude, longitude, and time, as photographic related information of a camera, from a GPS satellite used for a car navigation system, and records it together with the image on a photographic film.

As one type of this camera, for example, a camera which receives GPS information from a satellite by a GPS receiver, calculates geographical latitude and longitude of the photographic position from the GPS information such as received latitude and longitude, time, or the like, and selects a plurality of stored place names by a discriminating means according to the geographical latitude and longitude (Japanese Patent Publication Open to Public Inspection No. 247081/1991), and a camera which automatically records position-measurement data, obtained from a GPS receiver, together with a photographed image, on a recording medium such as a photographic film, or a memory device (Japanese Patent Publication Open to Public Inspection No. 70724/1992) are proposed.

In this connection, GPS information includes various information such as latitude, longitude, altitude, time, measured position calculation mode (which expresses 2 dimensional or 3 dimensional position measurements), a DOP value (which is the degree of error depending on the position of a satellite, and represents Dilution Of Precision), speed, advancing direction, satellite information, etc., and the predetermined time is required for receiving such information. Under consideration of this time, GPS information is transmitted at predetermined time intervals. Concretely, GPS information is transmitted approximately at 1 second intervals, and the time required for receiving the GPS information is approximately 700 ms.

GPS information includes various types of information, all of which is not always required for recording in a recording medium, and in any case, all information can not always be recorded due to limitation of the recording medium.

Because the transmission interval and the receiving time of GPS information are determined as described above, when the photographer pushes a shutter button when photographing, there is a possibility that the GPS information is being received, thereby, newest data is not completed. In such cases, a problem exists in which, when a shutter button is pushed, inaccurate information is read into a recording medium, or a problem exists in which GPS information can not be recorded into the recording medium in synchronization with pushing of the shutter button.

The first object of the present invention is to solve the above-described problems, and to record only correct information.

Furthermore, the above-described camera (refer to Japanese Patent Publication Open to Public Inspection Nos. 247081/1991, and 70724/1992), can not read position measurement data by a GPS receiver in places where the radio waves hardly arrive, for example, when photographing behind an obstacle, inside a building, or underground, and thereby, there is a problem in which the photographic location, corresponding to a film frame, photographed at such a location, can not correctly be recorded.

In order to solve the problem in which radio waves hardly arrive at a camera position, a camera (refer to Japanese Patent Publication Open to Public Inspection No. 67282/1994) is proposed in which the receiving status is discriminated by a receiving status discrimination means, and when receiving is impossible, data previously stored in a memory means is recorded on the photographic film or in a memory. Recently, in order to improve the accuracy of position measurement data to be recorded in a camera having information recording function (refer to Japanese Patent Publication Open to Public Inspection No. 67282/1994), a differential GPS (hereinafter, called DGPS), the accuracy of which is within several meters from the GPS receiver, is being generalized. Further, the present inventor has proposed a camera in which data from a sensor (for example, an azimuth sensor, or similar sensors) is added to position measurement data from a DPS receiver, and these data are recorded (refer to Japanese Patent Publication Open to Public Inspection No. 269017/1994).

The GPS selects a satellite to be used for position calculation on the basis of a DOP value, in order to optimize the geometrical accuracy. Specifically, the GPS searches all combinations of PDOPs from locus positions of the satellites, from which data is being received, and calculates a position by using 4 of the satellites which give the minimum PDOP in these PDOPs. Due to this calculation, a combination of satellites is selected, from which the optimal DOP value is obtained.

The GPS uses either a 2-dimensional position measurement (3-satellite position measurement), or a 3-dimensional position measurement (4-satellite position measurement), depending on conditions of the photographing location (measuring position), although cases, in which data can not be received at all, such as in a shielded underground position ,or in a tunnel, are not now under discussion. In the case of 3-dimensional position measurement, positional data can be received by using 4 satellites in a case where, for example, the location has an open view, such as grassy plains, no shielding obstacle exists around a photographing place (a measuring position), and data can be satisfactorily and continuously received. In the case of 2-dimensional position measurement, 4 satellites can not be used in cases where, for example, shielding obstacles, such as multistoried buildings, partially exist around the photographing position (measuring position) and thereby, complete data can not be received, and therefore, data is received from 3 satellites.

However, in the geometric accuracy, the accuracy of a 2-dimensional position measurement is lower than that of a 3-dimensional position measurement, and the accuracy of position measurement data is also not constant, being influenced by the status of arrangement of the satellites. That is, the accuracy of position measurement is influenced by the status of arrangement of satellites, caught to be used for calculation, and generally, the degree of error, depending on the arrangement of satellites, is expressed as GDOP (Geometrical Dilution of Precision). GDOP is a value obtained in such a manner that: a sphere, in which the measuring point is the center, is assumed; and GDOP is obtained, based on the volume of a tetrahedron, the apexes of which are points formed by the crossing of linear lines with the sphere, which connect the measuring point respectively to 4 satellites to be used for calculation. The larger the GDOP is, the larger the error is. Further, in GPS, noise, called S/A (Selective Availability), is superimposed on transmitted data from the satellite which reduces the accuracy. Position measurement data obtained from GPS is dispersed within 100 m, including various errors described above. Accordingly, when only position measurement data including errors described above, is recorded in a recording medium, the accuracy of the position measurement data is unknown, and thereby, it is difficult to specify the geodetic longitude and latitude.

When it can not be discriminated from which of general GPS and DGPS the position measurement data is obtained, it is difficult to specify the geodetic longitude and latitude.

Further, even when the photographer wants photographing when positional data of high photographic accuracy is received, it is difficult to judge the accuracy of position measurement data if accuracy data relating the position measurement data, for example, a DOP value or DGPS, is not displayed, which is inconvenient.

A camera in which a receiving status is discriminated by a receiving status discriminating means; and when receiving is impossible, data previously stored in a memory means is recorded on the film or recorded in a memory, (refer to Japanese Patent Publication Open to Public Inspection No. 67282/1994), can not receive data at photographing, in the above-described second receiving status. Further, when the accuracy of previously stored position measurement data is low, low accuracy position measurement data is recorded on a film or recorded in a memory.

In view of the foregoing technological problems, the second object of the present invention is to provide a camera, which can discriminate errors of position measurement data, and can record higher accuracy position measurement data on a recording medium together with a photographic image.

Even when a DGPS receiver is equipped in the above-described camera which can record data, previously stored in a memory means, on a photographic film, (refer to Japanese Patent Publication Open to Public Inspection No. 67282/1994), in order to increase the accuracy of position measurement data, when photographing is carried out while moving from one place to another place, the error of position measurement data from the geodesic longitude and latitude becomes too large, even if position measurement data at the previous photographing position, or position measurement data when the power switch is ON, are photographed. Concretely, when such position measurement data having large error is referred in the future, it can not be judged whether position measurement data was recorded at the receiving position, or recorded as a reference at a place where receiving was impossible. Accordingly, position measurement data which can be read from the recording medium is largely different from the actual geodesic longitude and latitude of the photographic position, and thereby, the reliability of the data is greatly decreased.

Further, in a camera in which data from a sensor (for example, an azimuth sensor, or the like) is recorded together with position measurement data from a GPS receiver, (refer to Japanese Patent Publication Open to Public Inspection No. 269017/1994), when an azimuth sensor which detects earth magnetism, is inclined with respect to the direction of the lines of magnetic force, error is caused in the azimuth data, and thereby, the reliability of position measurement data, recorded in the recording medium, is decreased, which is a problem.

In view of the technological problems described above, the third object of the present invention is to provide a camera, in which the reliability of position measurement data or azimuth data recorded together with a photographic image is increased.

SUMMARY OF THE INVENTION

The first object of the present invention is attained by the following camera.

A camera having an information recording function, incorporating a GPS receiver, and an information recording function to record received GPS information together with image information, comprising: a second memory in which received GPS information is successively written; a first memory in which a previously determined information in GPS information, written in the second memory, is selectively written; and a shutter button detection means to detect that the shutter button is depressed, the camera characterized in that: when the shutter button detection means detects that the shutter button is depressed, the camera waits until predetermined information becomes complete if predetermined information is incomplete in the first memory; and the complete predetermined information is chosen to be the information to be written onto the recording medium.

When predetermined information in the GPS information obtained by the above-described camera, is selectively stored in the first memory, predetermined information which is necessary for recording, can be selectively obtained. Further, when the shutter button is depressed, and if necessary information is not complete, the camera waits until it becomes complete, and the necessary information is made to be the recording information. Thereby, appropriate information can be recorded in synchronization with depressing of the shutter button.

The first object of the present invention is attained by the following camera.

A camera having an information recording function, which has a GPS receiver, and an information recording function to record received GPS information together with image information, comprising: a second memory in which received GPS information is successively written; a first memory in which a previously determined information in the GPS information, written in the second memory, is selectively written; and a shutter button detection means to detect that the shutter button is depressed, the camera characterized in that: when the shutter button detection means detects that the shutter button is depressed, the predetermined information in the first memory is made to be information to be written into a recording medium.

When predetermined information in the GPS information obtained by the above-described camera, is selectively stored in the first memory, predetermined information which is necessary for recording, can be selectively obtained. Further, in the case where the shutter button is depressed, appropriate information can be recorded in synchronization with depressing of the shutter button, when information in the first memory is made to be recording information.

The first object of the present invention is attained by the following camera.

A camera having an information recording function, which has a GPS receiver, and an information recording function to record received GPS information together with image information, comprising: a second memory in which received GPS information is successively written; a first memory in which a previously determined information in the GPS information, written in the second memory, is selectively written; and a shutter button detection means to detect that the shutter button is depressed, the camera characterized in that: when the shutter button detection means detects that the shutter button is depressed, if the predetermined information is not complete in the first memory, information in the first memory, after passage of a predetermined time, is made to be information to be written into a recording medium.

When predetermined information in the GPS information obtained by the above-described camera, is selectively stored in the first memory, predetermined information which is necessary for recording, can be selectively obtained. Further, in cases where the shutter button is depressed, when information is not complete, the camera waits until information becomes complete after passage of a predetermined time. Then, when information in the first memory is chosen as the recording information, appropriate information can be recorded in synchronization with depressing of the shutter button.

The first object of the present invention is further attained by the following camera.

A camera having an information recording function, which has a GPS receiver, and an information recording function to record received GPS information together with image information, comprising: a second memory in which received GPS information is successively written; a first memory in which a previously determined information in the GPS information, written in the second memory, is selectively written; a third memory in which GPS information, written in the first memory, is written; and a shutter button detection means to detect that the shutter button is depressed, the camera characterized in that: when the shutter button detection means detects that the shutter button is depressed, the predetermined information in the third memory is made to be information to be written into a recording medium.

When predetermined information in the GPS information obtained by the above-described camera, is selectively stored in the first memory, predetermined information which is necessary for recording, can be selectively obtained. Further, by the structure by which information in the first memory is stored in the third memory, even if a relatively long time is required for writing because information is successively written from the second memory into the first memory, when the shutter button is depressed, appropriate information can be recorded in synchronization with depressing of the shutter button, when information in the third memory is made to be the recording information.

The second object of the present invention is attained by the following structure.

A camera in which data obtained from a GPS receiver is recorded in a recording medium together with a photographing image, the camera comprising a recording means to record both position measurement data, obtained from the GPS receiver, and information, related to the accuracy of the position measurement data.

The accuracy data, related to the position measurement data, is a position measurement mode and a DOP value.

The accuracy data, related to the position measurement data, is information to discriminate DGPS and other factors.

The accuracy data, related to the position measurement data, is a position measurement mode, a DOP value, and information to discriminate DGPS and GPS.

A camera which records data obtained from a GPS receiver together with a photographing image in a recording medium, comprising: a memory means including a second memory to memorize the newest position measurement data, and accuracy data related to the position measurement data successively obtained from the GPS receiver; a latching means to prohibit a first memory of the memory means from rewriting the position measurement data and accuracy data relating to the position measurement data; and a comparison means to compare information relating to the accuracy of already latched position measurement data in the first memory, with information relating to the accuracy of successively obtained position measurement data in the second memory from the GPS receiver, the camera characterized in that: when it is judged by the comparison means that the accuracy of the successively obtained position measurement data in the second memory is higher than the accuracy of the already latched position measurement data in the first memory, then, the position measurement data and the accuracy data relating to the position measurement data, latched in the first memory by the latching means, are renewed.

A camera which records data obtained from a GPS receiver together with a photographing image in a recording medium, comprising: a memory means to memorize the newest position measurement data, and accuracy data relating to the position measurement data successively obtained from the GPS receiver; a latching means to prohibit the memory means from rewriting the position measurement data and accuracy data relating to the position measurement data; and a comparison means to compare information relating to the accuracy of already latched position measurement data, with information relating the accuracy of successively obtained position measurement data, in the position measurement data and the accuracy data relating to the position measurement data, successively obtained from the GPS receiver, the camera is characterized in that: when it is judged by the comparison means that the accuracy of the successively obtained position measurement data is higher than the accuracy of the already latched position measurement data, then, the position measurement data and the accuracy data relating to the position measurement data, latched by the latching means, are renewed; and the camera is provided with a recording means which records the renewed position measurement data and information relating to the accuracy of the position measurement data into a recording medium.

The above-described camera is provided with a display means to display accuracy data relating to the position measurement data.

In this connection, in the following embodiments, sometimes longitude and latitude data are referred to as position data, and thus, position data includes longitude and latitude data.

The third object is attained by the following structure.

A camera which records a photographic image and a plurality of data, obtained from a GPS receiver or a sensor, in a recording medium, the camera comprising: a memory means including a first memory to rewrite camera data with the newest data obtained from the GPS receiver or the sensor; a latching means to prohibit rewriting the data stored in a first memory of the memory means; and a recording means to record data, which is added by information to discriminate which specific one of a plurality of recording data, the data which is latched in the first memory by the latching means is, on a recording medium.

The camera is provided with a display means to display a plurality of data obtained from the GPS receiver or the sensor, and information to discriminate which data, the data latched by the latching means is, is displayed on the display means.

Data latched by the latching means is azimuth data, obtained from an azimuth sensor, which measures the azimuth, based on magnetic north of earth magnetism as the reference, and is position measurement data obtained from the GPS receiver.

Azimuth data in the data latched by the latching means is recorded in the recording medium together with a photographic image, and after that, latching of the azimuth data is released, and latching of the position measurement data is continued.

BRIEF DESCRIPTION OF THE DRAWINGS

FIGS. 8(a) and 8(b) are views showing the first example of a display of an external LCD 34.

FIGS. 11(A), 11(b) and 11(c) are views showing the second example of the display of the external LED 34.

FIGS. 22-1 through 22-6 are timing charts of several kinds of signals in the camera in Example 4.

DETAILED DESCRIPTION OF THE PREFERRED EMBODIMENT

Referring to the attached drawings, examples of the present invention will be described below.

Figure 1:
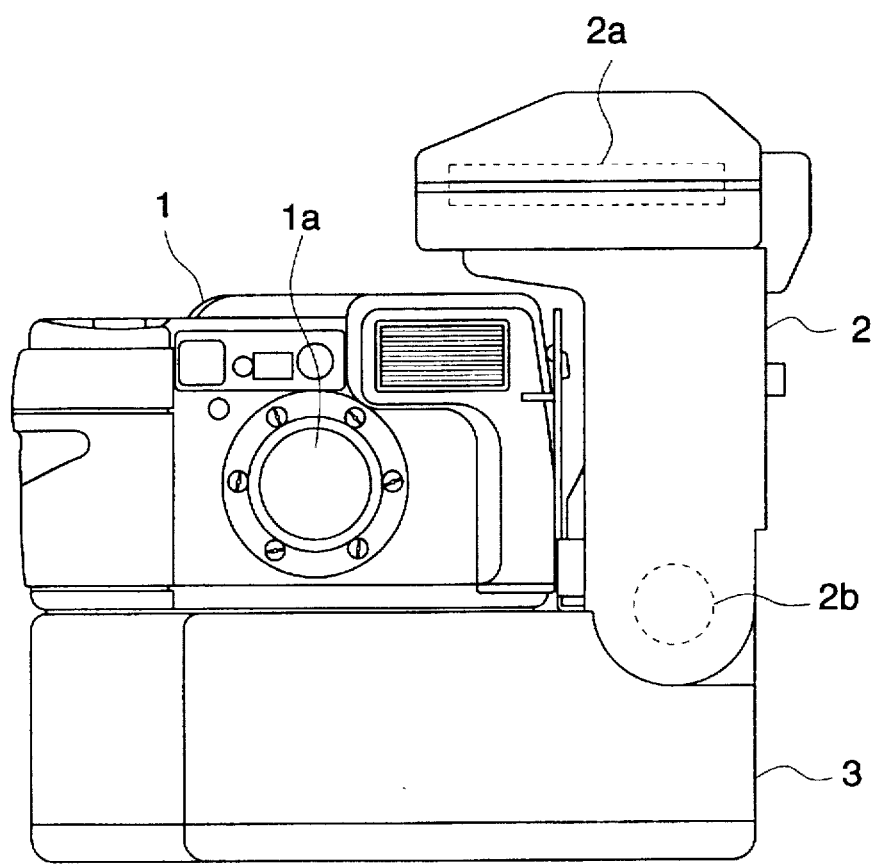
FIG. 1 is a front view of a camera of the present invention.
Figure 2:
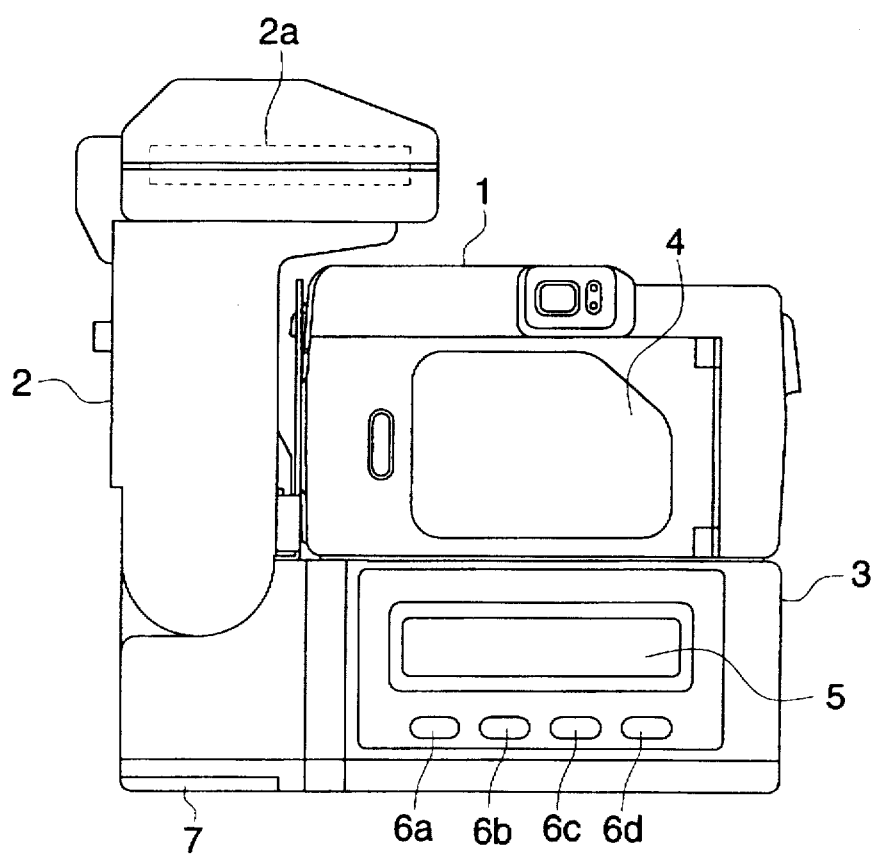
FIG. 2 is a rear view of the camera in FIG. 1.
Figure 3:
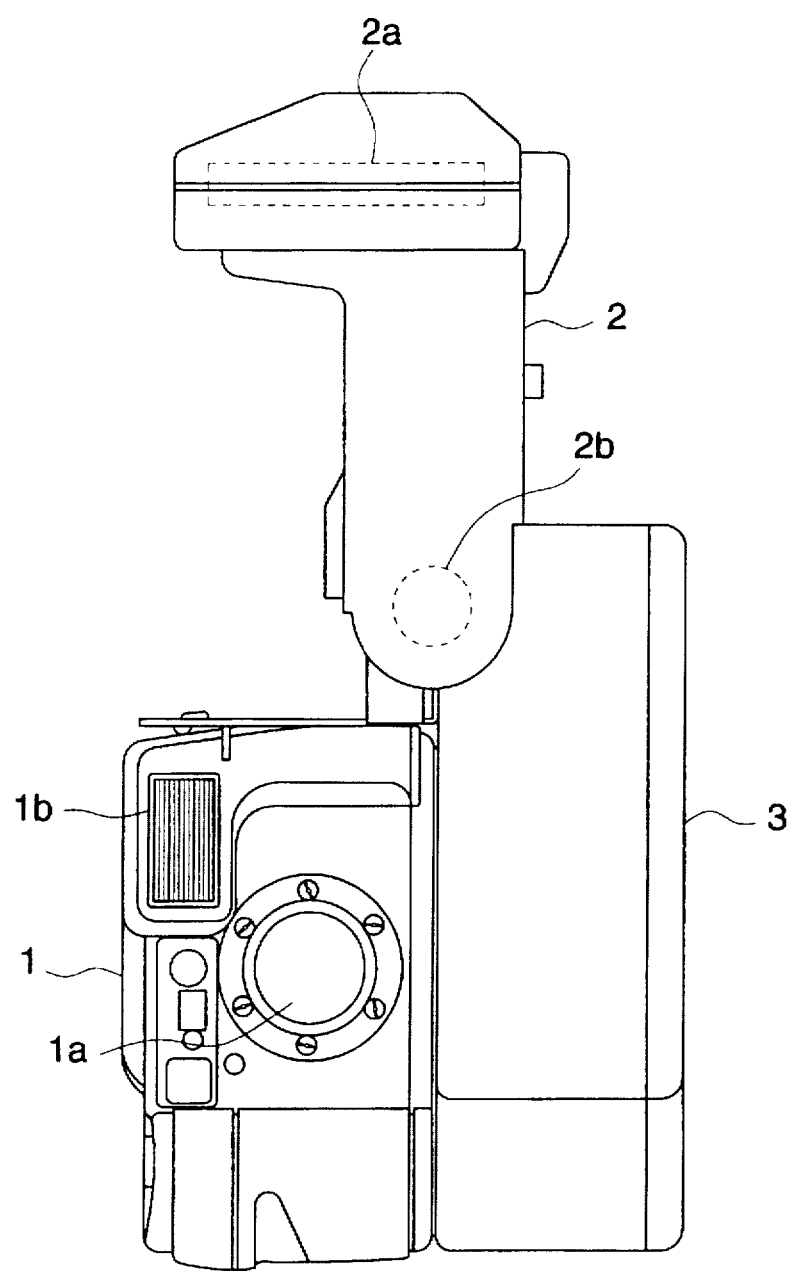
FIG. 3 is a front external view of the camera at photographing in the vertical camera position.

FIG. 1 is a front view of a camera, and shows an example of the present invention. FIG. 2 is a rear view of the camera in FIG. 1. FIG. 3 is a front view showing the external appearance of the camera at a photographing position in which the camera is held in the vertical direction.

In a camera of the present invention, as an example, a photographic film is used as a recording medium. As shown in FIGS. 1 and 2, the camera of the present invention is provided with: a camera body 1 by which an object image is photographed on a recording medium; an arm section 2 in which an information input means is housed, and which is located on the side of the camera body 1; and a processing circuit section which is located on the bottom of the camera body 1, and which processes position measurement data and time data, obtained from a GPS receiver 32. Each structure and its function will be described below.

Figure 4:
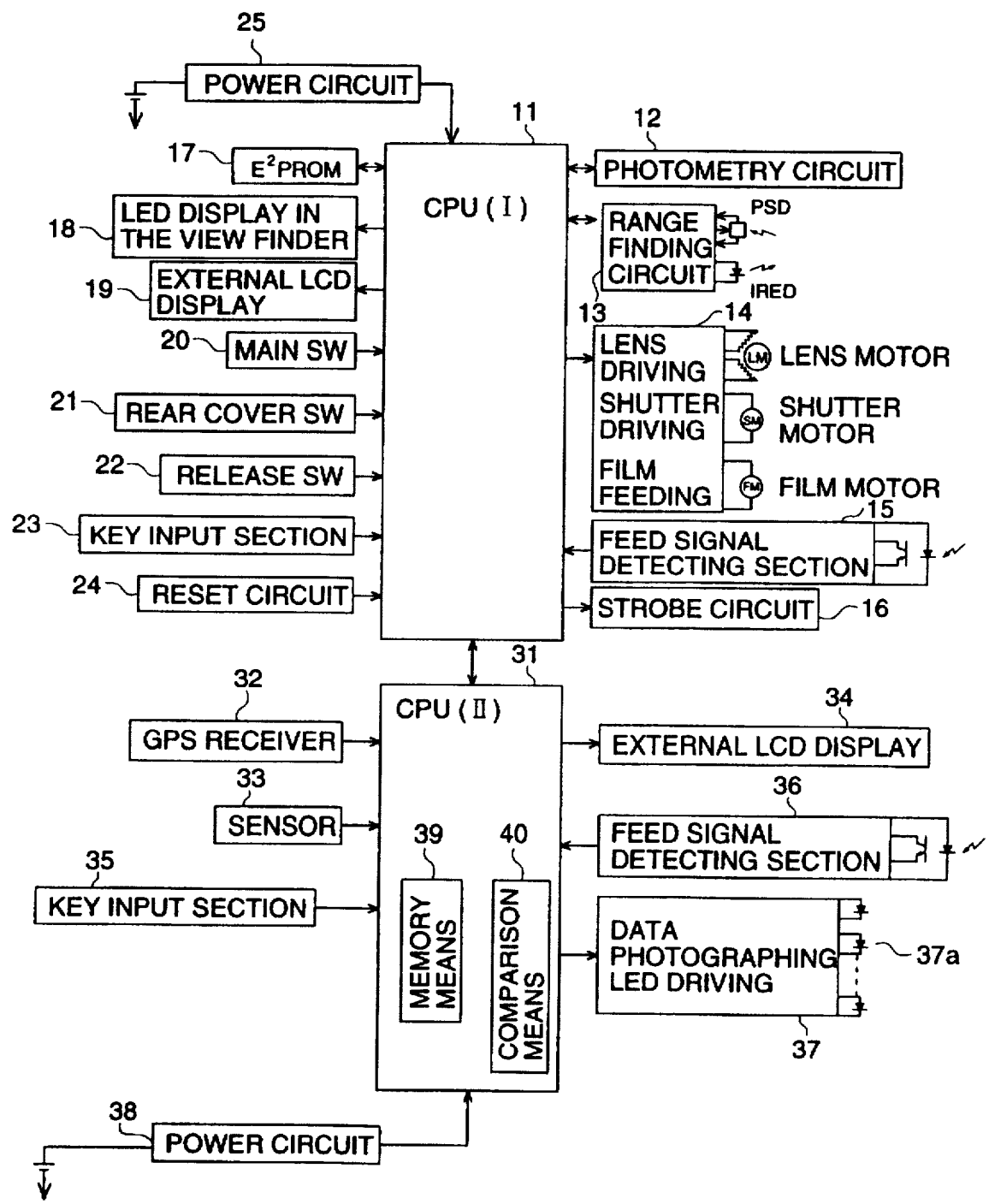
FIG. 4 is a block diagram showing the electrical structure of the camera of the present invention.
Figure 5:
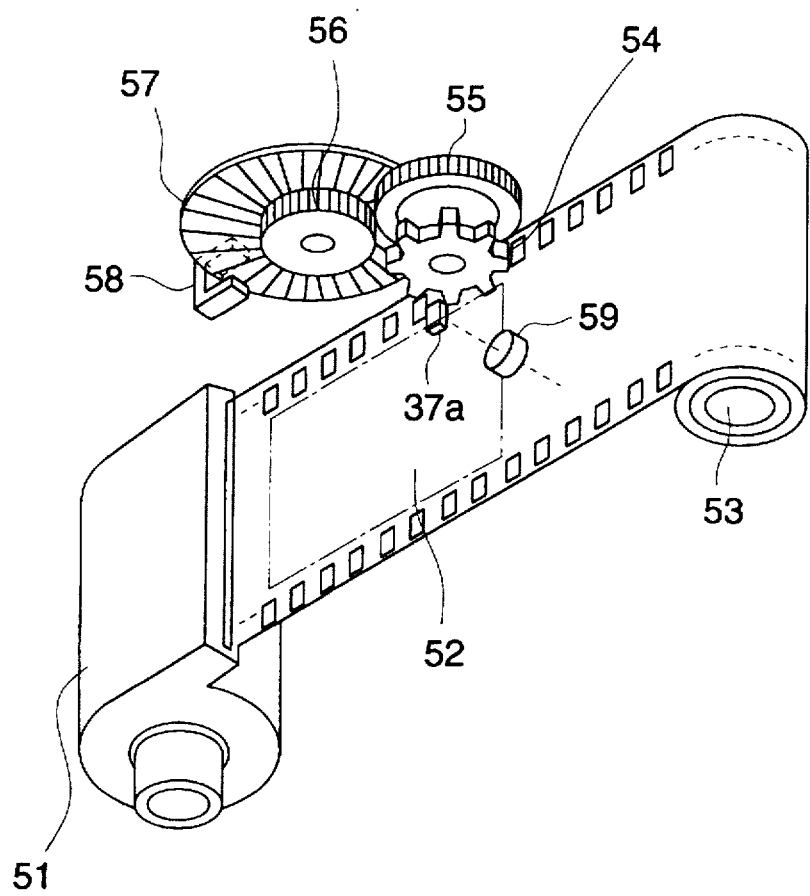
FIG. 5 is a view showing an arrangement of a feeding signal detecting section and recording LEDs.

As shown in FIGS. 2, 4, and 5, the rear surface of camera body 1 is provided with information photographing section 4; wherein LED dot array 37a is arranged linearly in the direction perpendicular to the film feeding direction. An information photographing section 4, which can records data obtained from the GPS receiver 32, an azimuth sensor, and an inclination sensor on a photographic film, when the LED dot array appropriately emits light, interlocked with film feeding, is provided in the camera.

As shown in FIGS. 1 and 2, the arm section 2 is rotatably pivoted about rotation axis 2b. On the top of the arm section 2, an antenna section 2a of the GPS receiver 32, which can obtain position measurement data of longitude, latitude, height and time, is provided, facing to the sky, as one of an information input means, so that data can be easily received from the GPS receiver. An azimuth sensor (not shown in the drawings), to detect the azimuth to which the camera body 1 is facing, is arranged in the arm section 2 in an appropriate predetermined position with respect to earth magnetism.

As shown in FIG. 2, the processing circuit section 3 is provided with a display section 5 to display each information and photographing information, such as photographing mode, to be recorded; an operation section 6 which selects photographing information so as to display desired information on the display section 5; and a battery cover 7 for the battery power source.

The operation section 6 has a function to designate latching, specifically in the present example, and is operated as follows.

As shown in FIG. 2, when both of buttons 6c and 6d are depressed, both of the longitude and latitude data and the azimuth data are designated to be latched. When the button 6c is depressed, only longitude and latitude data is designated to be latched, and when only the button 6d is depressed, only azimuth data is designated to be latched. In this connection, latching is released when the button 6b is depressed. The button 6a is a mode setting button.

It is assumed that the operator will photograph an object by the horizontal position photographing using the horizontal image surface, or by the vertical position photographing using the vertical image surface. In the case of the horizontal position photographing, photographing may be carried out by a position shown in FIG. 1 and FIG. 3. However, in the vertical position photographing, when the camera body 1 is simply rotated 90° from the condition shown in FIGS. 1 and 2, the arm section 2 is horizontally positioned, and the antenna section 2a of the GPS receiver 32 housed in the top portion of the arm section 2, and the azimuth sensor 33 are also tilted 90°, and thereby, correct information can not be obtained. Accordingly, when the arm section 2 is rotated around a rotation axis 2b by 90°, and is positioned in the condition shown in FIG. 3, the antenna section 2a faces skyward in the case of the vertical position photography, and thereby, correct information can be obtained.

In the camera body 1, although the arm section 2 is only rotated clockwise by 90° from the condition in FIG. 2, normally, photographing is carried out such that a strobe window 1b is positioned higher than a photographing lens 1a, and thereby, such a rotation of the arm section 2 poses no practical problems. Further, the arm section may be structured so as to be rotated by 360° as necessary. The above description was a mechanical structure of the camera of the present invention, and following that, an electrical structure will be described below.

FIG. 4 is a block diagram showing the electrical structure of the camera of the present invention.

Electronic components are largely separated into sub-systems, the outputs of which are inputted into a CPU (I) 11 on camera body 1, and which are controlled by the CPU (I) 11; and sub-systems, the outputs of which are inputted into a CPU (II) 31 in processing circuit section 3, and which are controlled by the CPU (II) 31.

The CPU (I) 11 is connected to: a photometry circuit 12; a range finding circuit 13 to measure a distance to the photographing object; a motor control section 14 for lens driving, shutter driving and film feeding; a feeding signal detection section 15 to detect a feeding signal (I) for one frame of a photographic film; a strobe circuit 16; an adjustment E²PROM 17; an LED display section 17 in the view finder; an external LCD display section 19 to display the number of exposed frames, or the like; a main switch 20; a rear cover switch 21; a release switch 22; a key input section 23 to input photographing modes; a reset circuit 24; and a power source holding circuit 25, and when these operations are controlled by a camera operation sequence which is written in a ROM housed in the camera body, an object image is photographed on the photographic film.

A lens motor LM is driven by a lens driving mechanism, a shutter motor SM is driven by a shutter driving mechanism, and a photographic film motor is driven by a film feeding mechanism. A feeding signal detecting section 15 detects a feeding amount of one frame of a photographic film, detects one frame of the photographic film by counting the number of perforations of the photographic film, and outputs a feeding signal. An adjustment E²PROM 17 stores auto-focus data, automatic exposure adjustment data, and other similar data. An LED display section 18 in the view finder displays conditions of the focused point, and the like, in the view finder (F). A rear cover switch 21 detects closure of the rear cover for automatic loading of the photographic film.

Further, the CPU (I) 11 is also connected to the CPU (II) 31 in the information recording-side. The CPU (II) 31 is connected to a GPS receiver 32, a sensor 33, an external LCD display section 34, a key input section 35, a feeding signal detection section 36, a recording LED driving section 37, a power source holding circuit 38, a memory means 39, and a comparison means 40. The CPU (II) 31 displays position measurement data from the GPS receiver 32 and data from the sensor 33 on the external LCD section 34 by a sequence written in a ROM equipped in the camera body, and photographs position measurement data and other data on the photographic film.

The sensor 33 measures the direction, in which magnetic north of the earth magnetism is defined as a reference, and outputs azimuth data. As types of sensors, there are a flux gate type, or an MR element type sensors. The external LCD display section 34 displays position measurement data or azimuth data. The key input section 35 is a switch input section to designate the recording content to the information photographing section 4. The feeding signal detecting section 36 is a detecting section to detect a minute movement amount of the photographic film during film feeding. The recording LED driving section 37 records characters or signals in the form of dot-matrix, by making a 7-segment LED section selectively emit light, corresponding to the feeding signal detecting section 36, wherein the 7-segment LED section is arranged one-dimensionally, being perpendicular to the direction of film feeding. The power source holding circuit 38 is a circuit to hold the voltage of the power source. The memory means 39 is a memory housed in the CPU (II) 31, and stores data from the GPS receiver 32 and the azimuth sensor 33. The CPU (II) 31 is used for rewriting time data, longitude and latitude data, and accuracy data relating to the longitude and latitude data, which are obtained in real time from the GPS receiver 32, and for temporarily storing them in the memory means. The CPU (II) 31 includes a latching means to temporarily prohibit rewriting the time data, longitude and latitude data, and accuracy data relating the longitude and latitude data, which are obtained in real time. The comparison means 40, which is realized by the software in the CPU (II) 31, is a means to compare the accuracy of position measurement data which is obtained in real time from the GPS receiver 32.

FIG. 5 is a view showing arrangement of the feed signal detecting section and the recording LEDs.

FIG. 5 is a view showing an outline of the arrangement and structure of the second feeding signal detecting section 36 and recording LED 37a. The photographic film is fed for each photographing from a film cartridge 51 onto a film winding shaft 53.

A film feeding mechanism is structured by: a film cartridge 51 in which a photographic film is loaded; a winding shaft 53 to wind up the photographic film; a sprocket 54 rotated by movement of perforations; a gear 55 coaxially rotated with the sprocket 54; a gear 56 driven by the gear 55; an encoder 57 coaxially rotated with the gear 56; and a photo-interrupter 58 to detect the rotation of the encoder 57.

The encoder 57 in the present example alternately has a transparent portion and an opaque portion, however, it may also alternately have a reflecting portion and a non-reflecting portion. In such case, the photo-interrupter 58 is replaced with a photo-reflector. An output signal of the photo-interrupter 58 becomes an output of the second feed signal detecting section 36, that is, a feeding signal 2.

The recording LED 37a is an LED array one-dimensionally aligned in the direction perpendicular to the direction of movement of the photographic film, and records an LED image on the photographic film through a photographing lens 59.

In the present example, although both the feed signal detecting section 36 and the recording LED 37a are arranged on the rear side of the photographing film, the present invention is not limited to such a structure, and even when one of these components, or both of these components, is arranged on the front surface of the photographic film, this system can function in the same manner. The above description is the general electric structure of the camera of the present invention.

Figure 6:
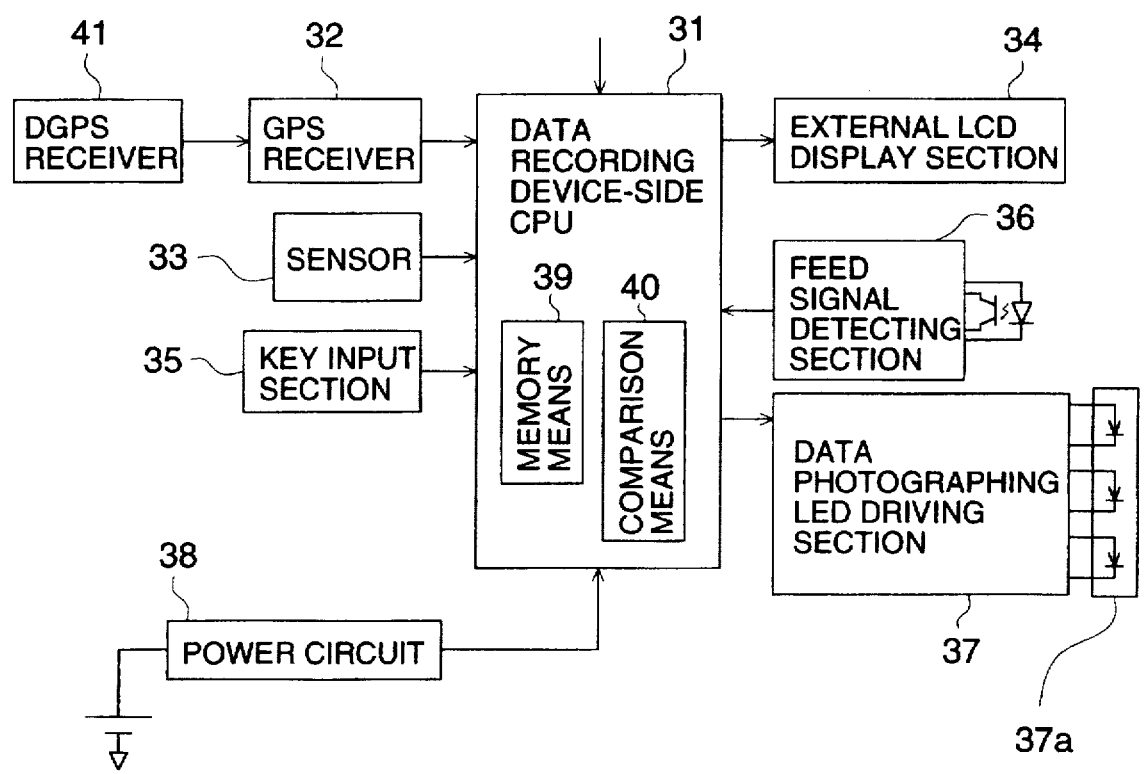
FIG. 6 is a block diagram showing an electrical structure when GDPS is used.

FIG. 6 is a block diagram showing the electric structure, when DGPS is active.

Because the mechanical structure is the same as that described above, the same numeric codes are denoted for the same parts, and the explanation is neglected. However, the electric structure is slightly different from that described above, and therefore, it will be described below referring to FIG. 6.

When DGPS is active, a DGPS receiver 41 is attached to the electric structure of the camera, described in FIG. 4. The DGPS receiver 41 sends, for example, data compensating for an error by S/A to the GPS receiver 32. The GPS receiver 32 obtains position measurement data of DGPS using the compensation data.

(EXAMPLE 1)

Next, operations of the camera structured as described above, in the first example to attain the second object to record high accuracy measurement data, will be described, referring to the flow charts shown in FIGS. 7, 8 and 9, and views of an example of a display of the external LCD, and recorded photograph.

GDOP can be divided into PDOP which is a portion relating to spatial coordinates, and TDOP which is a portion relating to time, and further, PDOP can be divided into HDOP which is a portion relating to a horizontal surface, and VDOP in the vertical direction. For example, in the case of 3-dimensional position measurement, a PDOP value is outputted as an error, and in the case of 2-dimensional position measurement, an HDOP value is outputted as an error.

TABLE 1

| Alphabet | DOP value |
|---|---|
| A | 1 |
| B | 2 |
| C | 3 |
| D | 4 |
| E | 5 |
| F | 6 |
| G | 7 |
| H | 8 |
| I | 9 |
| J | 10 |
| K | 11–12 |
| L | 13–15 |
| M | 16–20 |
| N | 21–30 |
| O | 31–50 |
| P | 51–99 |
| Q | 100– |

Table 1 shows actual DOP values corresponding to alphabet expressed as DOP values. In the present example, a DOP value is not directly displayed, but is shown by alphabet. In this connection, the DOP value is not necessarily shown by alphabet, but may be shown by Russian characters, katakana, or hiragana.

Figure 7:
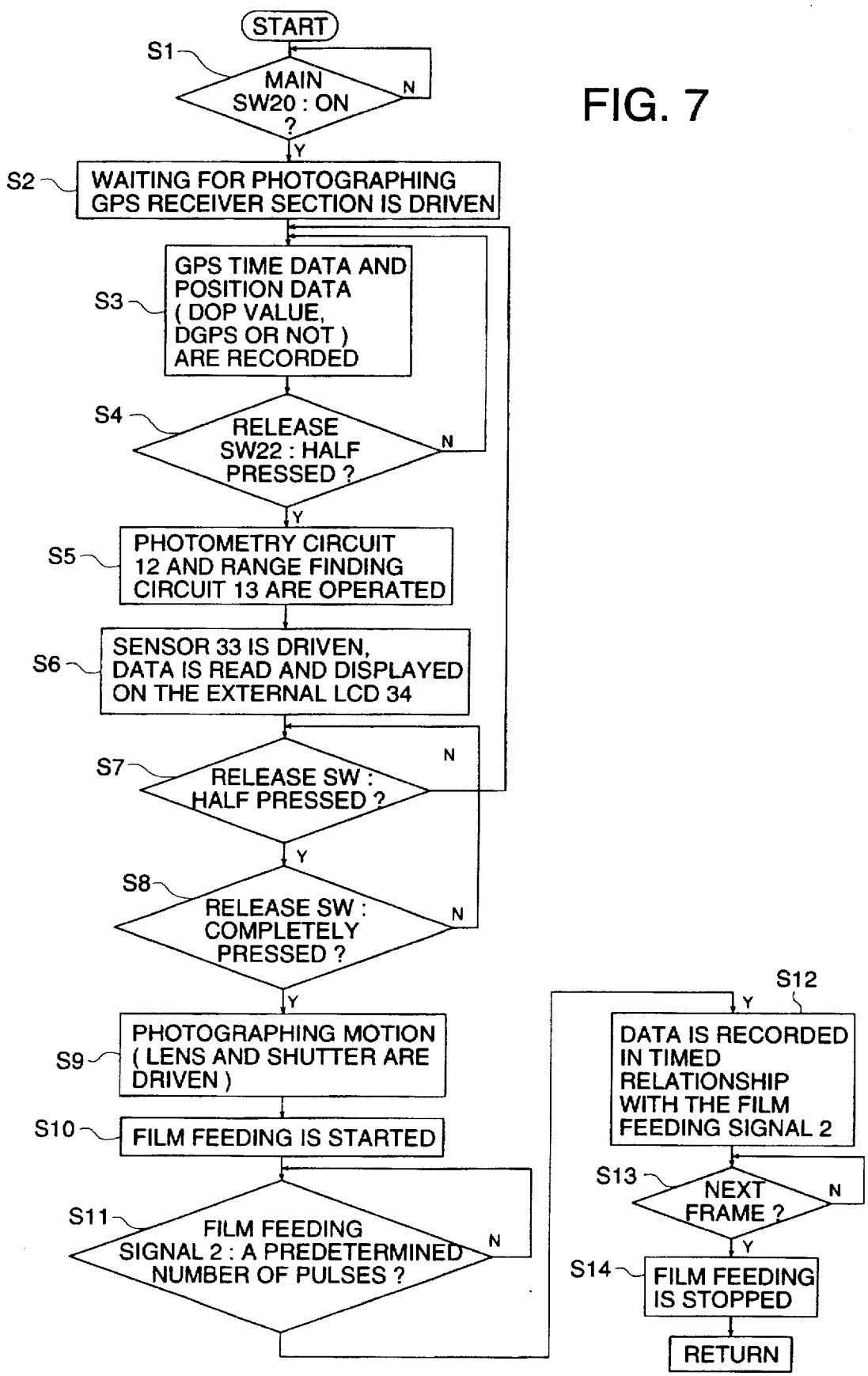
FIG. 7 is a flowchart of operations of the camera in Example 1.

FIG. 7 is a flow chart showing operations of the camera in the first example. FIG. 8 is a view showing the first example of the display of the External LCD 34, and FIG. 9 is a view of the first image photographed on the photographic film.

Initially, when the main switch 20 is turned on (step S1), the CPU(I) 11 and CPU(II) 31 are started. Thereby, the camera body 1 is ready for photographing, and the GPS receiver 32 is also started and catches the GPS satellite signals, so that time data, longitude and latitude data, and accuracy data are received (step S2).

Figures 8, 9:
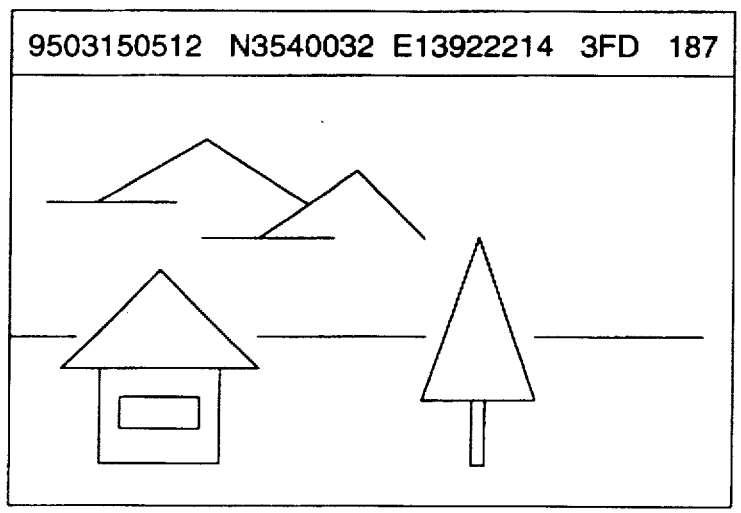
FIG. 9 is a view showing the first image photographed on a photographic film.

The CPU(II) 31 reads time data, longitude and latitude data, and the like, which are received by the GPS receiver 32, and displays them on the external LCD 34, as shown in FIG. 9 (step S3). Herein, accuracy data includes a position measurement mode showing 2-dimensional position measurement, or 3-dimensional position measurement, the DOP values, and data showing GPS or DGPS. Display modes of the external LCD 34 in step S3 will be described below. For example, a display "9503150512" shown at the left upper portion of the external LCD 34 shown in FIG. 8(a), is time data, which means 12 minutes past 5 o'clock, 15th, Mar., 1995. A display "N3540032" shown at the left under portion, is latitude data, which means 35° 40'.0032" North Latitude. A display "E13922214" shown at the right lower portion shows longitude data, which means 139° 22'.214" East Longitude. In a display "3FD" at the right upper portion, the numeral "3" shows 2-dimensional position measurement in the position measurement mode. In this connection, the numeral "4" shows 3-dimensional position measurement. "F" shows the DOP value, which means that the DOP value is 6. "D" shows DGSP, and when GPS is used, that column is empty.

The CPU(II) 11 detects the half-depressed condition of the release switch 22 in step S4. When the CPU(II) 11 does not detect such half-depressed condition of the release switch 22, the sequence returns to step S3 shown in FIG. 7, and the CPU(II) 11 reads position measurement data, received by the GPS receiver 32 as described above, and renews the display of the external LCD 34 (step S3). By this step, the position measurement data is renewed approximately every second.

Following the above, photographing operations of the camera body 1 will be described below.

When the CPU(I) 11 detects the half-depressed condition of the release switch 22 at step S4, it holds position measurement data displayed on the external LCD 34, and operates the photometry circuit 12, and the range finding circuit 13 (step S5). Further, the CPU(II) 31 drives the azimuth sensor 33, reads data, and displays it on the external LCD 34 (step 6). For example, the external LCD 34 shown in FIG. 8(b) displays "187" at the right upper portion in addition to the display shown in FIG. 8(a). This data shows azimuth data which represents a direction of 187° clockwise from magnetic north.

The CPU(I) 11 detects whether the release switch 22 is completely depressed or not (step S8), and when it detects the fully-depressed condition of the release switch 22, the camera body 1 starts photographing operations (step S9), the lens and shutter are driven by auto-focusing and auto-exposing operations based on photometry data and range finding data in step S5, and the object image is photographed on the photographic film.

After that, the CPU(I) 11 starts film feeding (step s10), the CPU(II) 31 detects the film feeding by the mechanism described in FIG. 5, and counts feeding signals 2 up to a predetermined number of counts which shows that a predetermined position of the photographic film is located at the photographing position. When the CPU(II) 31 counts the feeding signal up to a predetermined number of counts (step S11), it photographs previously read time data, longitude and latitude data, azimuth data, and accuracy data on the photographic film, synchronized with the feeding signal 2 (step S12).

The CPU(I) 11 still feeds the photographic film after the completion of photographic operations in step S12, and when the CPU(I) 11 detects that the film has been fed to the next frame by the feeding signal 1 (step S13), then, the feeding is stopped (step S14). The camera body 1 records a light image from the object, longitude and latitude data, time data, azimuth data and accuracy data, as shown in FIG. 9, on the photographic film, in a manner described in step S12. The CPU (II) 31 returns to the main routine and stops the photographic operations, because data photographed on the photographic film, shown in FIG. 9, does not include latched data which is retained and not cancelled in step 12.

When the camera of the first example is structured as described above, the position measurement data is recorded together with the photographed image, and the accuracy data relating to the position measurement data is also recorded. Therefore, the degree of error included in the position measurement data can also be judged later, and thereby the accuracy of position measurement data can be discriminated.

When the camera of the first example, is structured as described above, the accuracy of position measurement data can be confirmed before photographing, and therefore, the camera can also be ready for receiving the highly accurate position measurement data.

(EXAMPLE 2)

Next, operations of the camera of the present invention, in the second example to attain the second object, will be described below, referring to a flow chart, an example of a display of the external LCD, and a view of a recorded photograph, shown in FIGS. 10–12.

Figure 10:
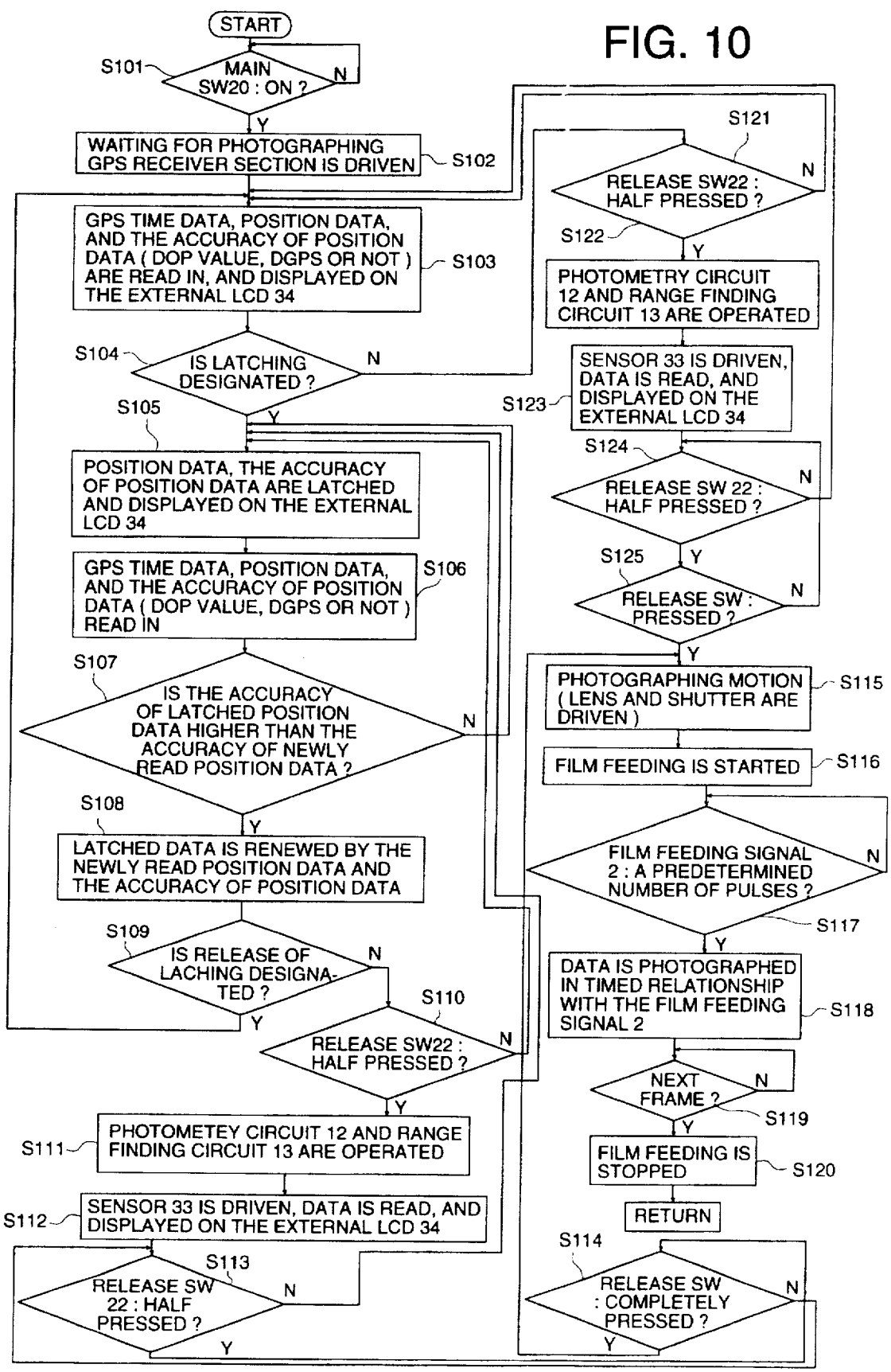
FIG. 10 is a flowchart showing operations of a camera in Example 2.

FIG. 10 is a flow chart showing operations of the camera in the second example. FIG. 11 is a view showing a second example of a display of the external LCD 34. FIG. 12 is a view showing a model of the second image photographed on the photographic film.

Operations in steps S101–S103 in the second example, are the same as those in steps S1–S3 in the first example.

In the second example, the CPU(II) 31 confirms the existence or non-existence of the latching designation for the accuracy data, from the key input section 35 provided on the operation section 6 (step S104). When the CPU(II) 32 confirms non-existence of the latching designation in step S104, it advances to step S121. The CPU(I) 11 detects the half-depressed condition of the release switch in step S121. When the half-depressed condition of the release switch 22 is detected, the CPU(I) operates, in steps S115–S125, in the same manner as in steps S4–S14 in FIG. 7.

Following the above description, photographic operations when latching is designated, will be described below.

When the CPU(I) 11 detects that latching to instruct so as to hold data of greater accuracy is designated in step 104, the CPU(II) 31 temporarily stops the rewriting operations of the memory means 39, and latches longitude and latitude data and their accompanying accuracy data, which have already written, stores them in the first memory of the memory means 39 and displays them on the external LCD 34 (step S105). The CPU(II) 31 reads time data, longitude and latitude data, and accuracy data relating to longitude and latitude data, from the GPS receiver 32 (step S106), stores them in the second memory of the memory means 39 and compares accuracy data which is newly read with the accuracy data which is already latched, by the comparator means 40 (step S107). Accuracy data relating to longitude and latitude data is determined such that the accuracy, in descending order, is DGPS, the 3-dimensional position measurement, and the DOP value. Concretely, the accuracy of DGPS is greater than that of GPS, and the accuracy of the 3-dimensional position measurement is greater than that of any DOP value of the 2-dimensional position measurement. When the CPU(II) 31 judges that the newly read accuracy data is less accurate than already latched accuracy data, in step S107, the newly read latitude and longitude data and accuracy data are replaced with the already latched latitude and longitude data and accuracy data relating to the latitude and longitude data; and the sequence returns to step S105; then the CPU(II) 31 repeats reading time data, latitude and longitude data and accuracy data relating the latitude and longitude data, and comparing the accuracy data (step S105, S106, S107). When the CPU(II) 31 judges that the newly read accuracy data stored in the second memory is more accurate than the already latched accuracy data stored in the first memory, in step S107, the CPU(II) 31 renews the latitude and longitude data and accuracy data relating to the latitude and longitude data in the first memory with the newly read data (step S108). Here, condition of display on the external LCD 34 in step 108, will be described below. The display on the external LCD34 changes from that in FIG. 11(a) to that in FIG. 11(b). Specifically, the display of "3F" in the right upper portion is changed to "4G", which means that the 2-dimensional position measurement is changed to the 3-dimensional position measurement. This shows that the 3-dimensional position measurement has priority over the 2-dimensional position measurement according to an agreement relating to the priority hierarchy of the accuracy data described above.

The CPU(II) 31 confirms the existence or non-existence of release of latching designation in step S109. When the CPU(II) 31 detects release of latching in step S109, the CPU(II) 31 returns to step S103.

When the CPU(II) 31 does not detect the release of latching in step S109, the CPU(II) 31 detects the half-depressed condition of the release switch 22 in step S110. When the CPU(II)31 does not detect the half-depressed condition of the release switch 22, it returns to step S103, and repeats reading the time data, and accuracy data relating to the longitude and latitude data, which are received by the GPS receiver 32, and comparing-processing of the accuracy data.

When the CPU(I) 11 detects the half-depressed condition of the release switch 22 in step S110, under the condition that the CPU(II) 31 does not detect the release of latching in step S 109, the CPU(I) 11 operates, in steps S111–S120, in the same manner as in steps S4–S14 in FIG. 7, and advances to photographing operations.

Incidentally, in the above example, the accuracy data are compared when latching is designated. However, the accuracy data can be compared when the latching is not designated, and measurement data having higher accuracy data determined by the comparison can be always stored in the first memory.

Figures 11, 12:
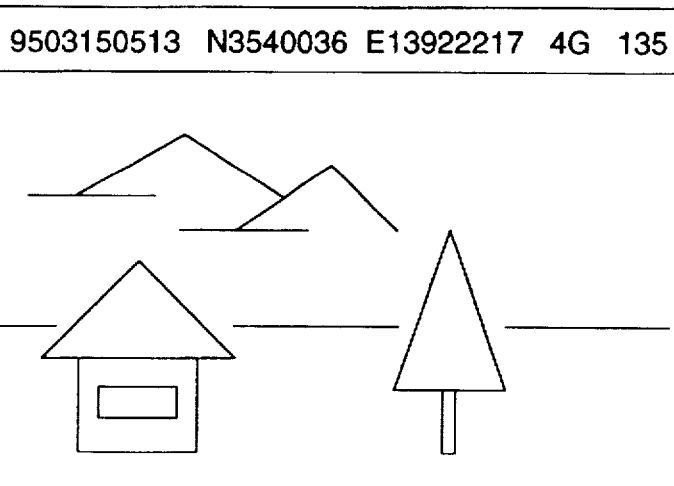
FIG. 12 is a view showing the second image photographed on the photographic film.

FIG. 12 is a view showing a model of a photograph, to which the accuracy of the longitude and latitude data is added. Time data, longitude and latitude data, and azimuth data are recorded on the upper portion of the photograph, and "4G" is displayed between the longitude and latitude data, and azimuth data.

When the camera of the second example is structured as described above, position measurement data is recorded together with the photographed image, and further, accuracy data relating to the position measurement data is also recorded. Accordingly, the accuracy of the position measurement data can be judged even in the later case, and thereby, the accuracy of the position measurement data can be discriminated.

In the case where the camera of the second example is structured as described above, when receiving conditions are not good, and when the position measurement data and the accuracy data relating to the position measurement data are latched, and position measurement data having the higher accuracy is obtained, the already latched position measurement data is renewed, and thereby, the position measurement data having the higher accuracy can be recorded on the photographic film.

When the camera of the second example is structured as described above, the accuracy of the position measurement data can be confirmed before photographing, and thereby, the camera can be ready for receiving position measurement data having the higher accuracy.

(EXAMPLE 3)

Operations of the camera of the present invention in the third example to attain the third object to intentionally inhibit to renew data, will be described below, referring to flow charts, an example of the display of the external LCD, and a view showing a model of the recorded photograph.

Figure 13:
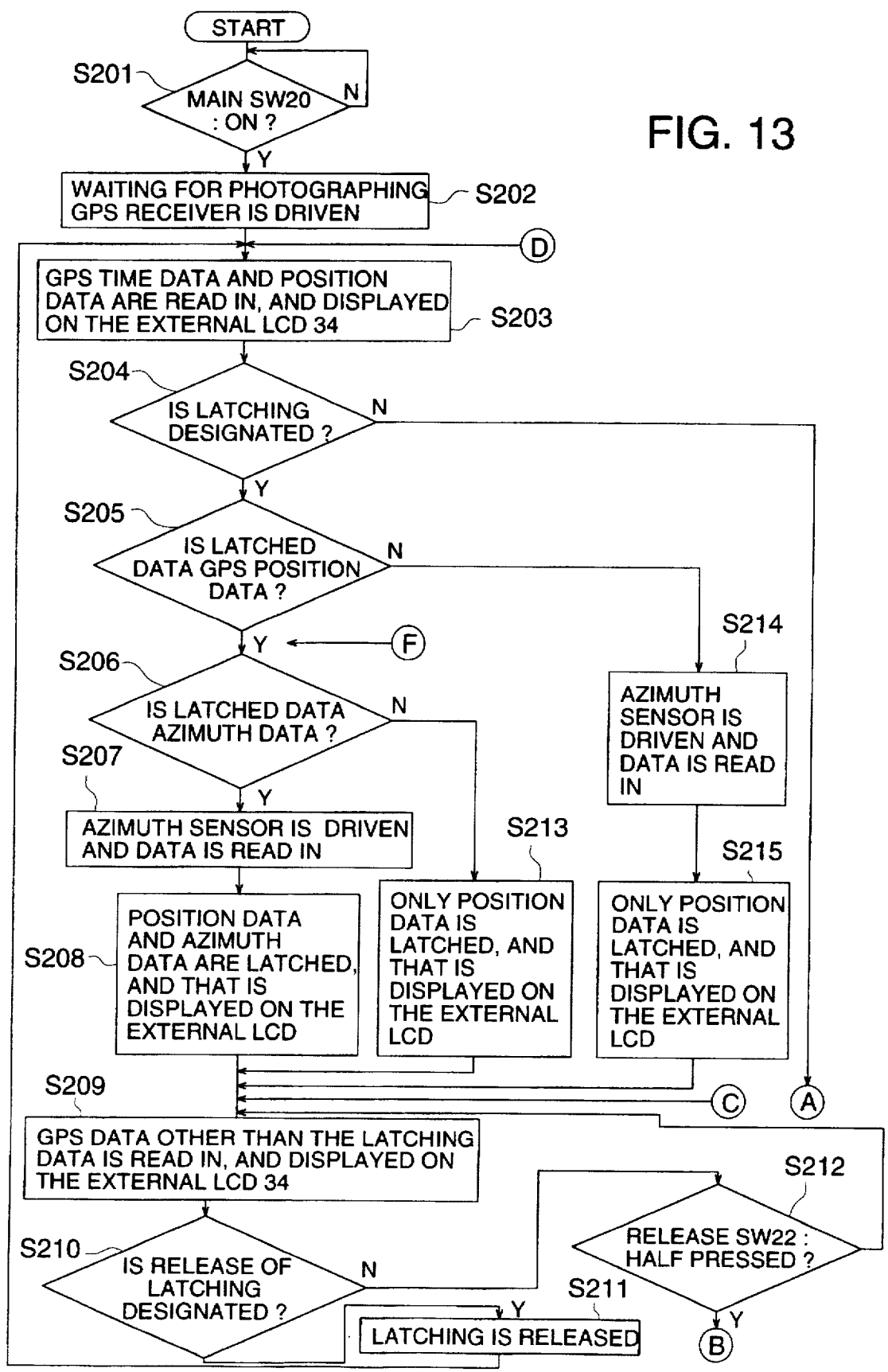
FIG. 13 is a flowchart showing operations of a camera of Example 3.
Figure 14:
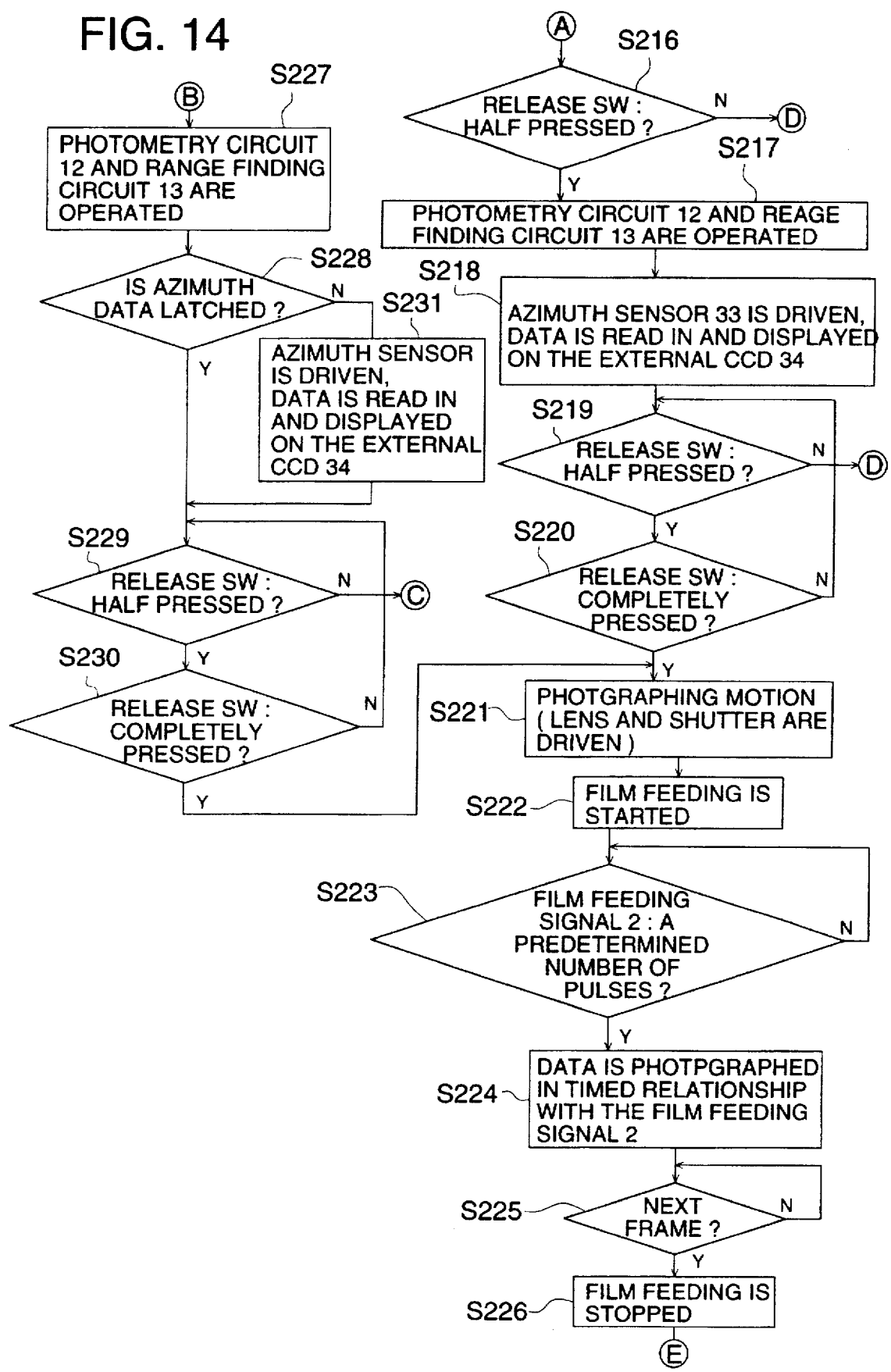
FIG. 14 is a flowchart showing operations of the camera of Example 3.
Figure 15:
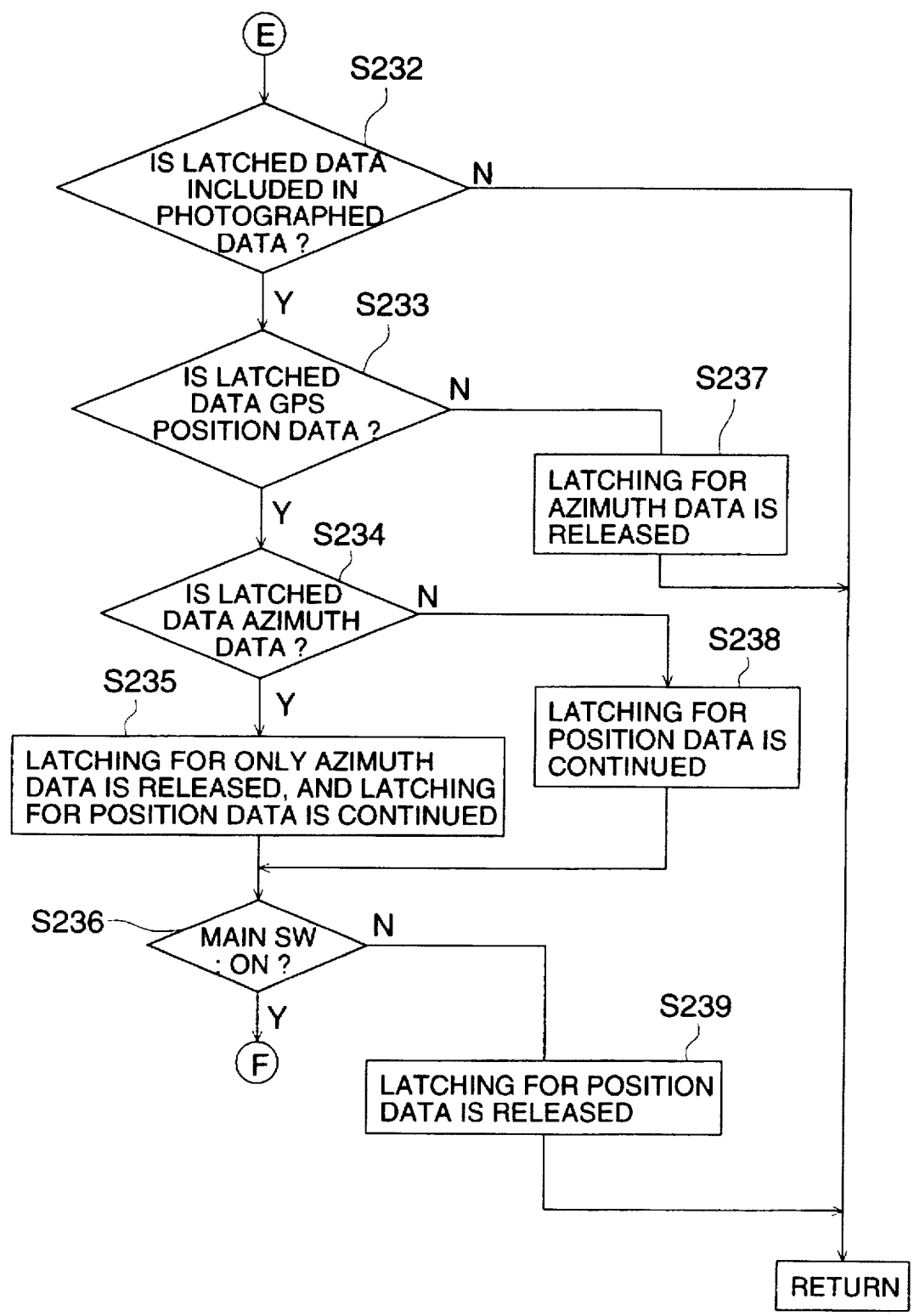
FIG. 15 is a flowchart showing operations of the camera of Example 3.

FIGS. 13, 14 and 15 are flow charts showing operations of the camera of the present example. FIGS. 16(a)–16(d) are views showing models of the first example of the display of the external LCD 34.

In the second example, the CPU(II) 31 confirms the existence or non-existence of the latching designation to inhibit to renew data, from the key input section 35 provided in the operation section 6 (step S204). When the CPU(II) 32 confirms non-existence of the latching designation in step S204, it advances to step S216 shown in FIG. 14. The CPU(II) 11 detects the half-depressed condition of the release witch 22 in step S216. When the CPU(II) 11 does not detect the half-depressed condition of the release switch 22, the sequence returns to step S203 shown in FIG. 13, and the CPU(II) 11 reads position measurement data, received by the GPS receiver 32 as described above, and renews the display of the external LCD 34 (step S203, S204, and S216). These steps explain operations by which the position measurement data is renewed approximately every 1 second.

When the CPU(I) 11 detects the half-depressed condition of the release switch 22 in step S216, it operates in the same manner as in steps S4–S14 in FIG. 7, in steps 216–226, and photographs the object and records the data.

Following that, the photographing operation when the latching data is included in photographing data, will be described below.

When latching to inhibit to renew data is designated in step S204 shown in FIG. 13, the CPU(I) 11 confirms for which data the latching is designated (steps S205, S206).

Figure 16:
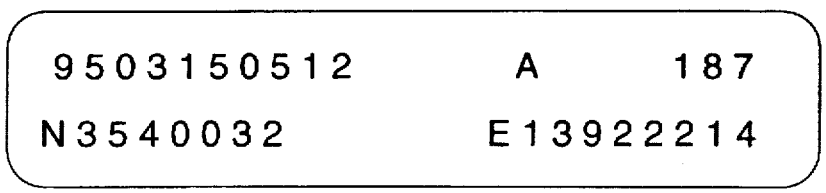
FIGS. 16(a)–16(d) are views showing examples of the display of the external LCD 34.
Figure 16:
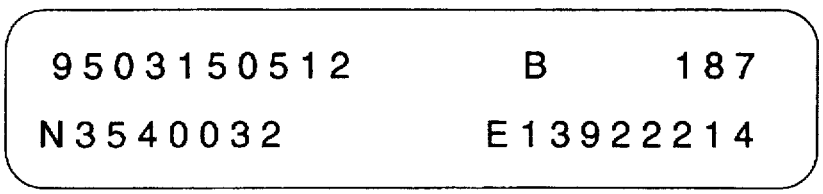
Figure 16:
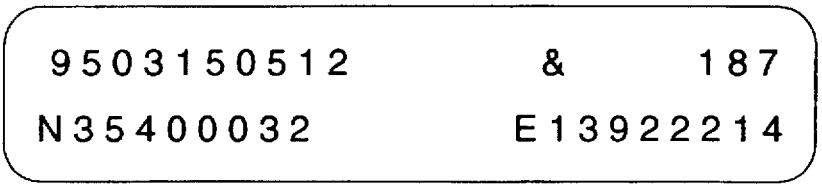
Figure 16:
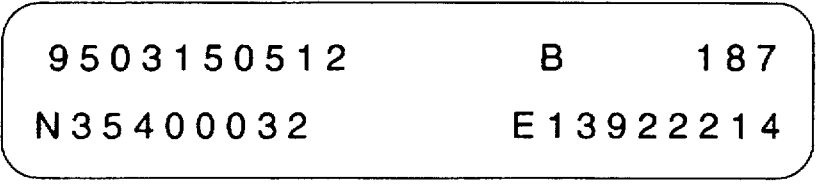

The CPU(I) 11 confirms whether latching of the longitude and latitude data is designated (step S205). When latching of the longitude and latitude data is not designated, the CPU(I) 11 advances to step S214. Due to this, the CPU(II) 31 drives the azimuth sensor 33 and reads azimuth data (step S214), transfer the azimuth data from the second memory to the first memory of the memory means 39 and displays the data, which is latched the first memory, on the external LCD 34 (step S215). Time data, longitude and latitude data, azimuth data, and also "A", which means that the azimuth data is latched, are displayed on the external LCD 34, as shown in FIG. 16(a).

When the CPU(I) 11 confirms that latching of the longitude and latitude data is designated in step S5, it confirms whether latching of the azimuth data is designated (step S206). When the CPU(I) 11 confirms that latching of the azimuth data is not designated, and it latches only the longitude and latitude data, and displays that longitude and latitude data are latched in the first memory of the memory means 39, on the external LCD 34 (step S213). Time data, longitude and latitude data, azimuth data, and in addition to that, also "B", which means that the longitude and latitude data are latched, are displayed on the external LCD 34, as shown in FIG. 16(b).

When the CPU(II) 31 detects that latching of both azimuth data, and longitude and latitude data is designated from steps S205 and S206, it reads the azimuth data by driving the azimuth sensor 33 (step S207), latches the azimuth data, and longitude and latitude data in the first memory of the memory means 39, and displays these data on the external LCD 34 (step S208). As shown in FIG. 16(c), "&", showing that both longitude and latitude data, and azimuth data are latched, is displayed on the external LCD 34. In this connection, "&" may flicker so as to attract attention of the photographer.

The CPU(II) 31 also reads position measurement data other than latched data from the GPS receiver 32; while renewing these data, it displays these data on the external LCD 34, following the display motion of any external LCD 34 in steps S208, S213, and S215; and waits for designation of release of latching (step S210). That is, the CPU(II) 31 confirms the existence and non-existence of designation of release of latching in step S210. When the CPU(II) 31 detects designation of the release of latching, or when the CPU(I) 11 does not detect the half-depressed condition of the release switch 22, the CPU(II) 31 repeats the loop of the sequence of step S209, step S210, and step S212. When the CPU(II) 31 detects the designation of the release of latching in step S210, the CPU(II) 31 releases latching (step S211), and returns to step S3.

When the CPU(I) 11 detects the half-depressed condition of the release switch 22 in step S212, it advances to step S227 shown in FIG. 14. Due to this, the CPU(I) 11 operates the photometry circuit 12 and the range finding circuit 13 (step S227). The CPU(II) 31 then confirms whether the azimuth data is latched or not (step S228), and when it confirms that the azimuth data is not latched, the CPU(II) 31 drives the azimuth sensor 33, reads the azimuth data, and displays the same on the external LCD 34 (step S231). The azimuth data is displayed in addition to time data, longitude and latitude data, and "B", showing that longitude and latitude data are latched, on the external LCD 34, as shown in FIG. 16(d). In this connection, the azimuth data may be added to other data, and displayed on the external LCD 34, as shown in FIG. 16(a) or FIG. 16(c).

The CPU(I) 11 confirms in step S229 whether the release switch 22 is half-depressed or not. When it detects interruption of the half-depressing of the release switch 22, the CPU(I) 11 returns to step S209, and repeats the loop of sequence of steps S209, S210, and S212, as described above.

When the CPU(I) 11 detects the completely depressed condition of the release switch 22 in step S230, photographic operations from step S221 through step S226 are carried out, and thus data recording is carried out, as described above. At this step, when latching is designated, the latched data in the first memory is recorded. Following this, the CPU(II) 31 detects stop of film feeding, and advances to step S232 in FIG. 15.

The CPU(II) 31 confirms whether latched data is included in the recorded data, or not (step s232), and when the latched data is not included, it returns to the main routine.

When the CPU(II) 31 confirms in step S232 that latched data is included, it confirms whether the latched data is longitude and latitude data, or not (step S233). When the CPU(II) 31 judges in step S233 that the latched data is not longitude and latitude data, it releases the latch of azimuth data, and returns to the main routine.

When the CPU(II) 31 judges in step 233 that the latched data is longitude and latitude data, it further confirms whether azimuth data is also latched, or not (step S234). When the CPU(II) 31 judges that the azimuth data is not latched, in step S234, it continues latching for longitude and latitude data (step S238). When the CPU(II) 31 judges that latching of the azimuth data is designated, in step S234, it releases latching for only azimuth data, and continues latching for longitude and latitude data (step S235).

Following that, the CPU(I) 11 confirms the depressing of the main switch 20 (step S236). When the CPU(I) 11 judges that the main switch 20 is not depressed in step S236, the CPU (II) 31 releases latching of longitude and latitude data (step S239), and returns to the main routine. When the CPU(I) 11 detects that the main switch 20 is depressed in step S236, the CPU(II) 31 returns to step S206, shown in FIG. 13. Thereby, the CPU(II) 31 repeats the above-described steps while continuing latching of longitude and latitude data.

Figure 17:
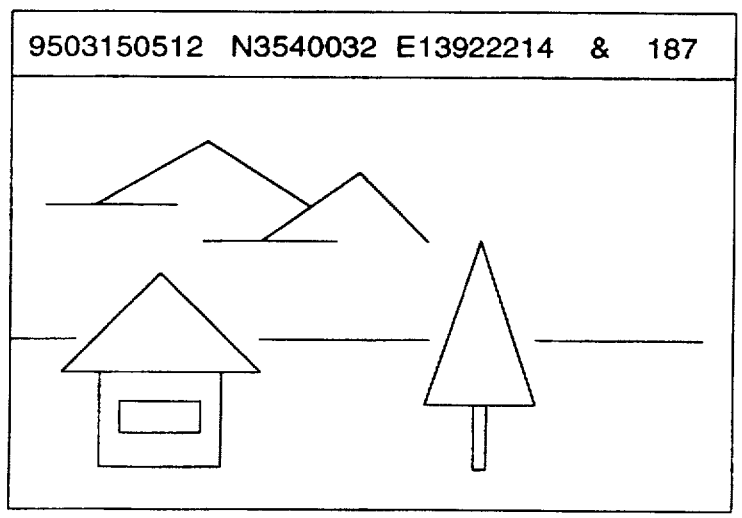
FIG. 17 is a view of the second image photographed on the photographic film.

FIG. 17 shows a model of a photograph in the case where both of azimuth data, and longitude and latitude data are latched. In the upper portion of the photograph, time data, longitude and latitude data, and azimuth data are recorded, and "&" is displayed between the longitude and latitude data, and the azimuth data. This "&" mark represents that both of longitude and latitude data, and azimuth data are latched data, as described above.

In this connection, in the third example, a "B" mark shows that longitude and latitude data are latched, and an "A" mark shows that azimuth data is latched, as described above. These marks are not limited to the present example, but latching of azimuth data or longitude and latitude data may be displayed by other marks.

As described above, the camera in the third example comprises a memory means 39 including the second memory to rewrite data by up-dating data obtained from a GPS receiver 32 or an azimuth sensor 33 and the first memory to store the latched data; a latching means to prohibit rewriting data stored in the first memory of the memory means 39, (refer to step 204–step S212 shown in FIG. 13); and a CPU(II) 31 to record data on the photographic film in addition to information which discriminates which data in plural data the data, which is latched by the latch means, is. Thereby, when the position measurement data, recorded together with the photographing image, is confirmed later, the position measurement data or azimuth data obtained in the photographing position can be clearly judged from these data latched in the position other than the photographing position, and therefore, it can be judged that the reliability of the position measurement data or azimuth data is high or low. Accordingly, a camera which can increase the reliability of the position measurement data or azimuth data, can be provided.

Further, the camera in the third example comprises, as described above, an external LCD 34 which displays a plurality of data obtained from the GPS receiver 32 or the azimuth sensor 33, and when information to discriminate which data the data which is latched by the latch means is, is displayed on the external LCD 34, the photographer can confirm which data is latched, before photographing. Accordingly, a camera which can prevent erroneous operations, can be provided.

Further, in the camera in the third example, as described above, data latched by the latch means, (refer to step S204–step S212), is azimuth data obtained by the azimuth sensor 33 to measure the direction based on magnetic north of the earth magnetism, and position measurement data obtained from the GPS receiver 32. Accordingly, when the data to be latched is determined so as to be at least one of position measurement data or azimuth data, data can be latched by a combination of only the position measurement data, only the azimuth data, or both the position measurement data and azimuth data. Therefore, a camera can be provided which can cope with all of: the case in which: the position measurement data can not be obtained in the photographing position when photographing is conducted under conditions when the camera body is approximately horizontal; the case in which the position measurement data can be obtained in the photographing position when photographing is conducted in the manner that the camera body is tilted; and the case in which photographing is conducted in the photographing position in which the position measurement data is not obtained in the manner that the camera body is tilted.

As described above, the camera, in the third example, releases latching of azimuth data and continues latching of position measurement data, after azimuth data in the data latched by the latch means (refer to step S204–step S212) has been recorded on the photographic film together with the photographic image. Thereby, a camera can be provided in which, when the photographed content on the film is referred to after photographing, if the azimuth data is not latched, it can be considered that such azimuth data has a relatively large error, although it is clear from the photograph that photographing was carried out while the camera body was tilted.

(EXAMPLE 4)

Figure 18:
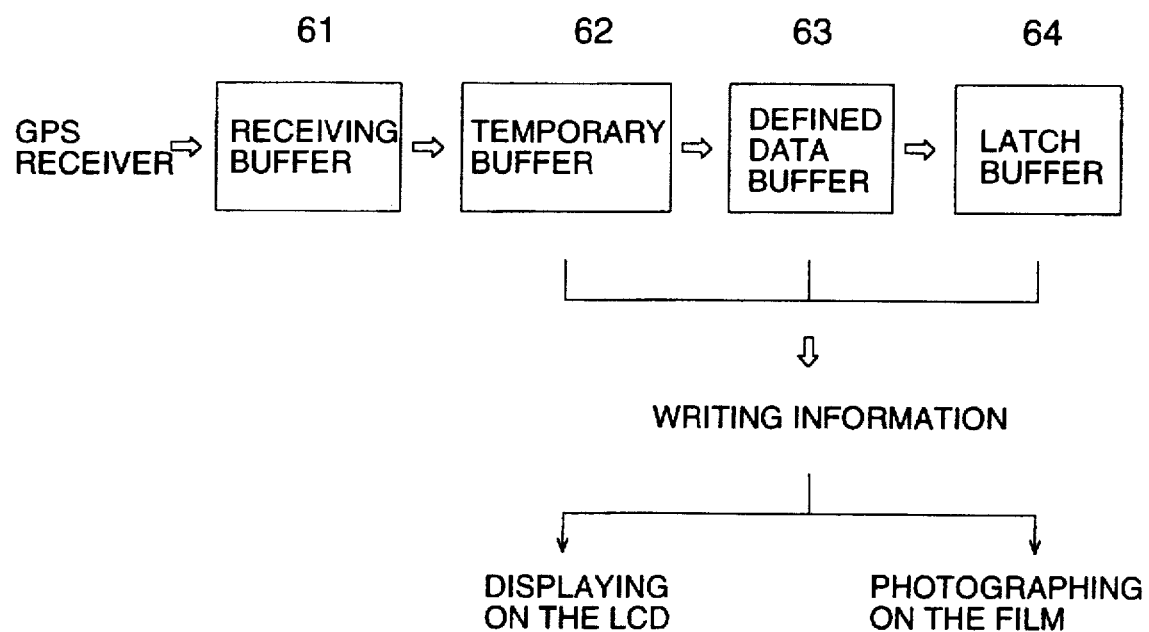
FIG. 18 is a circuit diagram showing the electrical structure in a camera of Example 4.

In the above-described Examples 1, 2 and 3, the first object can be attained when a data recording device is structured to have a memory as shown in FIG. 18. Numeral 61 is a receiving buffer which is an example of the second memory in the present invention, and in which received GPS information is successively stored. Numeral 62 is a temporary buffer which is an example of the first memory of the present invention, and in which information necessary for recording selected from the information stored in the receiving buffer 61, is stored. Numeral 63 is a defined data buffer which is an example of the third memory of the present invention, and in which contents in the temporary buffer are successively stored. Numeral 64 is a latch buffer used in the latching mode. These buffers may be provided in a memory means 39, or may be separately provided.

Also in Example 4, in the same manner as in Examples 1, 2 and 3, when the shutter button 22 is half-depressed, photometry and range finding are carried out. In this case, when GPS information is not complete, GPS receiving-processing is carried out until the shutter button 22 is completely depressed.

Then, when the shutter button 22 is completely depressed during GPS information receiving-processing, information in the temporary buffer 62 is checked, and when it is complete, the information is recorded onto the recording medium.

In this connection, the system can also be structured such that it discriminates, before information recording onto the recording medium, whether GPS information is normally received; or when the latching mode is adopted, it discriminates whether the latching mode is active, or not.

Figure 19:
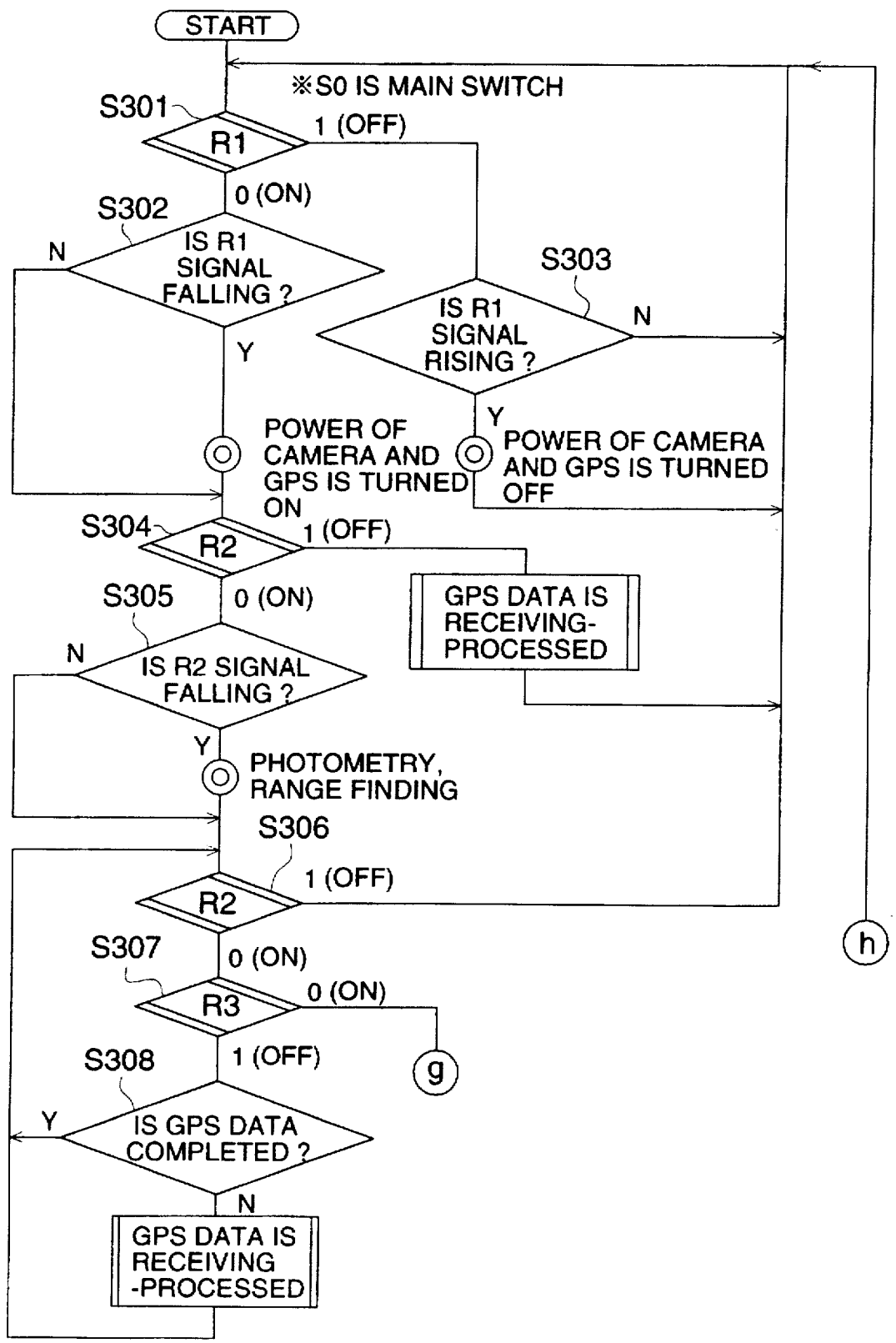
FIG. 19 and FIG. 20 are flowcharts showing processing operations of the camera in Example 4.
Figure 20:
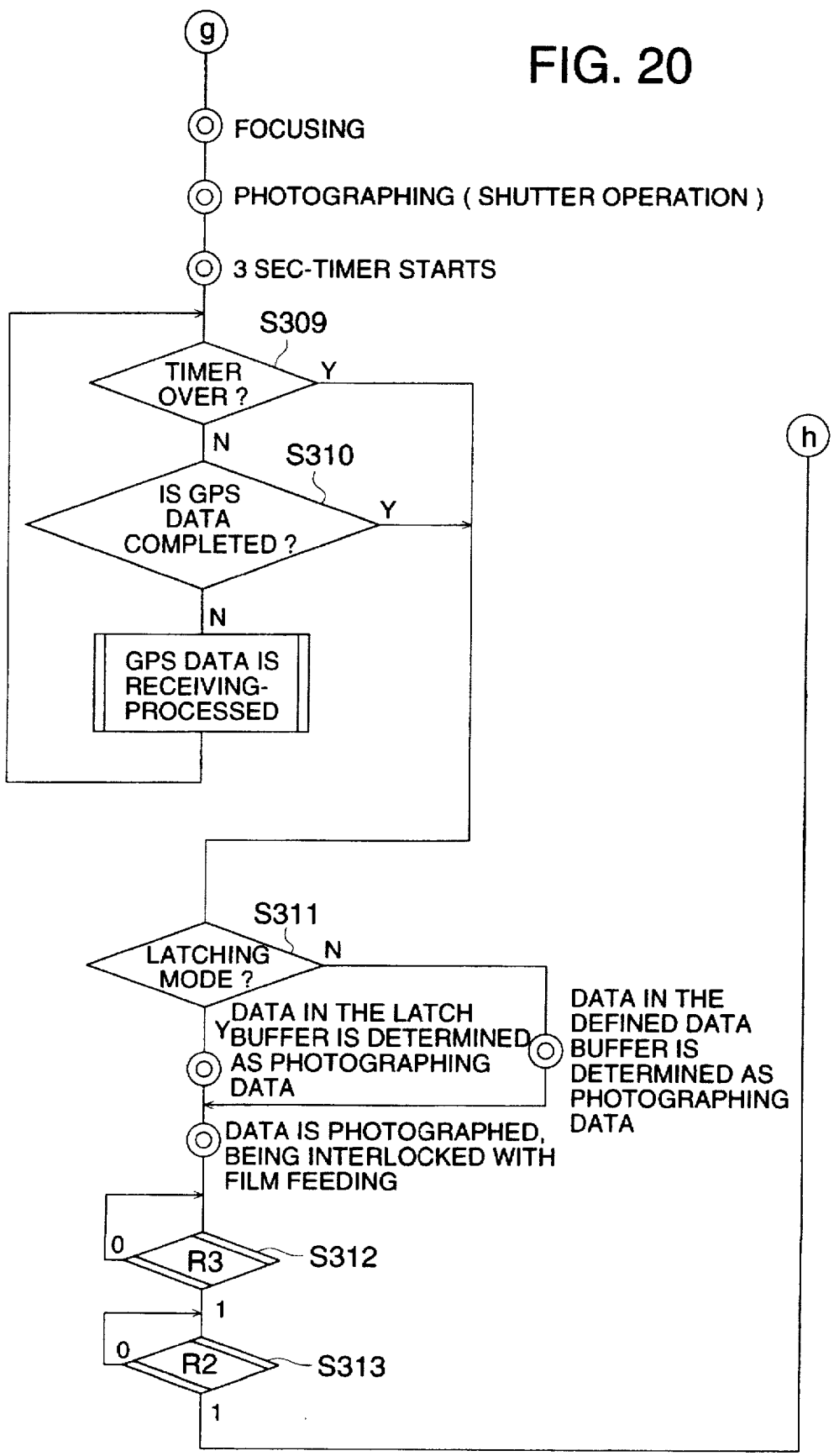

The foregoing operations will be detailed below, using flow charts shown in FIGS. 19 and 20.

(1). The sequence judges the R1 signal, which indicates that the main switch 20 is depressed (step S301).

When the R1 signal is "1" (the main switch 20 is turned off), the sequence judges whether the R1 signal is rising, or not (step S303). When it is rising, that is, it is OFF, the sequence turns the power source of the camera and the GPS receiver OFF, and when the R1 signal is not rising, the sequence returns to START. When the power source of the GPS receiver is turned OFF, the contents in all the buffers (the receiving buffer, temporary buffer, defined data buffer, and latch buffer) are cleared.

When the R1 signal is 0 (the main switch 20 is ON), the sequence judges whether the R1 signal is falling or not (step S302). When it is falling, that is, the main switch 20 is turned ON, the power source of the camera and the GPS receiver is also turned ON. When the R1 signal is not falling, the R2 signal is judged. In this connection, the system may be structured such that the contents in all the buffers (the receiving buffer, temporary buffer, defined data buffer, and latch buffer) are cleared when the power source of the GPS receiver is turned ON.

(2). The sequence judges the R2 signal which shows the half-depressing state of the shutter button 22 (step S304).

When the R signal is "1" (OFF, not-half-depressed), GPS receiving-processing, which will be described later, is carried out, and the sequence returns to START.

When the R2 signal is 0, (ON, half-depressed), the sequence judges whether R2 signal is falling, or not (step S305). When the R2 is falling, that is, when it is half-depressed, photometry and range finding can be carried out. When the R1 signal is not falling, no additional processing is carried out, and the sequence waits until the R3 signal, indicating the complete depressing of the shutter button 22, is "0" (ON, completely depressed condition), or until the R2 signal is "1" (OFF, release of the shutter button). When the R2 signal is OFF, the sequence returns to START.

While the R2 signal is ON and the R3 signal is OFF, when GPS information in the temporary buffer 62 is not complete, receiving-processing of the GPS information is carried out, and when the information is complete, the sequence waits to check the state of the R2 signal and the R3 signal. In this connection, the sequence may be structured such that it judges whether GPS data is complete or not, based on information in the latch buffer 64 when the latch mode is active, and based on information in the defined data buffer when the latch mode is not active (step S311).

(3). When the R3 signal is turned ON, the focusing operation and the shutter operation are carried out. When predetermined information (latitude, longitude, accuracy, time, or the like) in GPS information is complete in the temporary buffer 62 (the second memory), the film feeding operation is carried out, and writing information is photographed onto the film by using the LED, being interlocked with the film feeding operation (step S307). Then, the sequence waits for the OFF signal ("1", release of the shutter button) of the R2 signal and the R3 signal, and returns again to START when these signals are turned OFF (steps S312, S313).

When predetermined information is not complete in the temporary buffer 62, the sequence waits for a predetermined time (in this example, 3 seconds) for the completion of all information before the film winding operation, and when the information is complete, film winding, and photographing operation on the recording medium, interlocked with the film winding, are carried out (steps S309, s310). When the photographing operation is quickly carried out although all of predetermined information are not complete, a time lag, up to actual photography, is controlled.

As a structure to confirm that predetermined information is complete in the temporary buffer 62 used for processing in steps S308 and S310, for example, when final information in predetermined information is written from the receiving buffer 61 into the temporary buffer 62, a flag (for example "1") may be stored in the receiving buffer 61 together with selected information. When this flag is "1", it can be judged that predetermined information is complete. In this connection, in the case where the first information in predetermined information is written from the receiving buffer into the temporary buffer, when this flag "1" is cleared (the flag is changed to "0"), it is judged that predetermined information is not complete, while information is being written into the temporary buffer 62.

Further, the system can also be structured such that information, in which the information can be normally received or not, is added, as the condition in which information is complete. In this case, there are cases in which predetermined information is not complete, even after the passage of 3 seconds. In the case in which information is not complete even after the passage of 3 seconds, information of NG (information can not normally be received), or the like, is photographed, being interlocked with the film winding operation, when the film winding operation is carried out.

The system can be structured such that predetermined selected GPS information is photographed onto the film, together with image information, using information in the latch buffer 64 when the latch mode is active, or information in the defined data buffer 63 when the latch mode is not active, in the same manner as in the temporary buffer 62. When information in the defined data buffer 63 is used, even in the case where a long period of time is required for writing from the receiving buffer 61 into the temporary buffer 62, the information in the defined data buffer is used as writing information when information in the defined data buffer is recorded, synchronized with depressing of the shutter button 22.

Figure 21:
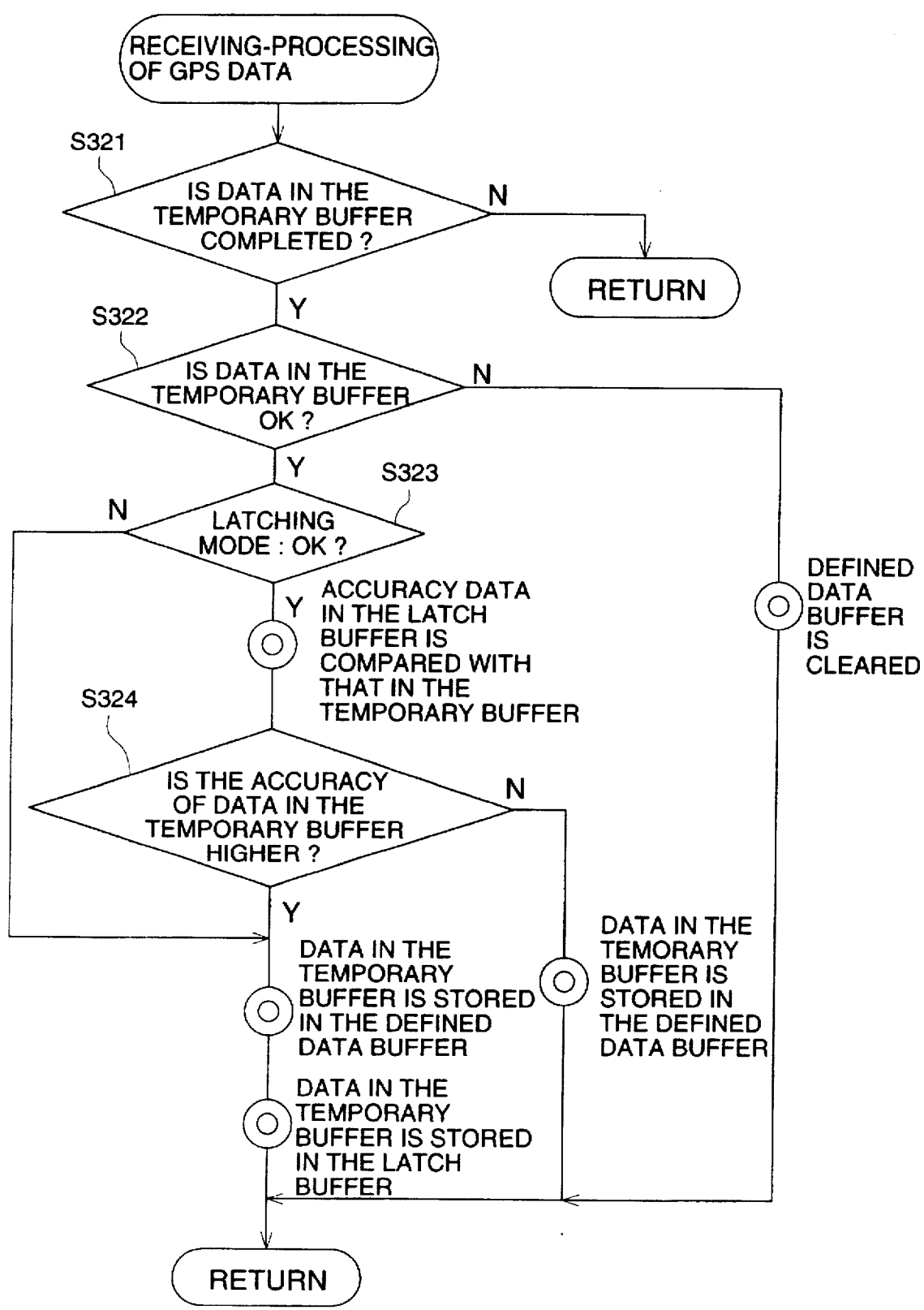
FIG. 21 is a flowchart of processing operations of the camera in Example 4.

Next, referring to FIG. 21, the receiving-processing of GPS information will be detailed.

When electric power is supplied to the GPS receiver, data such as time, latitude, longitude, height, DOP value, position measurement calculation mode, or the like, is outputted at a predetermined time interval. This GPS information is successively stored in the receiving buffer 51.

Then, information necessary for writing on the recording medium (for example, time, latitude, longitude, or the like) is selected from the GPS information written in the receiving buffer 61, and stored in the temporary buffer 62. The sequence judges whether information in the temporary buffer 62 is complete, that is, whether all of predetermined information is complete (writing is completed) (step S321), and further, judges whether the latch mode is active (step S323). When the latch mode is not active, the contents in the temporary buffer 62 are written in the defined data buffer 63, determined as writing information in the recording medium, and written in the recording medium, being interlocked with film feeding. Further, GPS information stored in the receiving buffer 61 is not always normal information, and therefore, when information in the receiving buffer 61 is selected and stored in the temporary buffer 62, the sequence judges whether it is normally received (OK) not (NG), from the obtained GPS information (step S322), and that information is then stored in the temporary buffer 62 together with other information.

When information in the temporary buffer 62 is not normally received information (OK), the content of the temporary buffer 62 is cleared. When information in the temporary buffer 62 is OK, the latch mode discrimination is carried out.

When the latch mode is not active, information in the temporary buffer 62 is stored in the defined data buffer 63 and the latch buffer 64. When the latch mode is active, the accuracy data in the latch buffer 64 is compared to that in the temporary buffer 62 (step S324). Only when the accuracy of information in the temporary buffer is higher, information in the latch buffer 64 is rewritten. In this case, information in the defined data buffer 63 is always rewritten, and when the accuracy of the information in the temporary buffer 62 is equal to that in the latch buffer, the sequence judges it to be higher.

In this connection, when the receiving buffer 61 is structured such that its information is overwritten every time when new GPS information is received from the GPS receiver, the internal memory can be saved.

The latch mode is structured such that information in the temporary buffer 62 is stored in the latch buffer 64 when the latch mode is set and information is normally received at first. However, when the content of the latch buffer 64 is rewritten only in cases where the accuracy of newly received information in the temporary buffer 62 is not less than that of data in the latch buffer 64, the accuracy of information can be successively higher. This is used for the purpose in which information in the latch buffer 64 is determined to be information to be written on the recording medium, when GPS information can not be normally received, or when the accuracy of received data is low, although data has been normally received. In this example, the comparison of the accuracy of GPS information is carried out by the position measurement calculation mode (2-dimensional position measurement or 3-dimensional position measurement) and DOP value.

When the current mode is not the latch mode, information in the temporary buffer 62 is stored in both of the defined data buffer 63 and the latch buffer 64, and even when the current mode is changed to the latch mode, the system can cope with it. The content of the temporary buffer 62 is always stored in the defined data buffer 63 during normal receiving, regardless of the latch mode or not, and the newest information is always stored in the defined data buffer 63. Accordingly, the latch mode is released, information in the defined data buffer 63 can be used as writing information without delay.

Next, when the shutter button is depressed, the processing using the information in the defined data buffer 63 as writing information on the recording medium, will be described using FIG. 22.

FIG. 22-1 in FIG. 22 shows the condition of the main switch 20 (R1 signal). FIG. 22-2 shows the half-depressed condition of the shutter button 22 (R2 signal), and FIG. 22-3 shows the completely depressed condition of the shutter button 22 (R3 signal). FIG. 22-4 shows GPS information, which is successively written, in the receiving buffer 62. FIG. 22-5 shows information which is selected and stored, in the temporary buffer 62. "OK" described in information in the temporary buffer 62, shows that information has been normally received. FIG. 22-6 shows camera operations.

First, in the case where the shutter button 22 is depressed when information in the temporary buffer 62 is complete, (timing T2 after information of (1) in the drawing is stored), the information of (1) is made to be writing information without delay. Next, photometry and range finding are carried out. When the shutter button 22 is completely depressed, focusing and shutter operation, are carried out and photographing is carried out, being interlocked with film winding.

Secondly, in the case where the shutter button 22 is depressed when information in the temporary buffer 62 is not complete, (at timing T1 while information of (1) is being written), the sequence returns to the main routine without additional operation (the GPS receiving information records only predetermined necessary information during interrupt processing in the temporary buffer 62). Then, the processing routine is repeated until required information is complete, and information of (1) is made to be writing information on the recording medium when it is confirmed that the information of (1) is complete.

As described above, writing information on the recording medium can be obtained. The sequence carries out writing processing of the obtained information on the film, being interlocked with film winding.

In the case where the condition, in which predetermined information necessary for writing is complete, is that GPS information is normally received (OK), when information in the temporary buffer 62 is NG (not normally received), and the shutter button 22 is depressed, GPS information is NG (not normally received), and information is not complete at timing when the half-depressed S1 signal is ON. In this case, when the shutter button is half-depressed, photometry and range finding are started. When information is NG (is not complete) at complete depressing of the shutter button, focusing and shutter operation are started. However, because information necessary for writing is not complete, photographing is not started, and the sequence waits for a maximum of 3 seconds until information is complete (normal reception: OK) after the shutter operation. When information is complete, the information is made to be writing information, and film winding and photographing are started. However, when information is NG even after the passage of 3 seconds, data "NG" is photographed. In the case of NG, the waiting time for normally received data is not limited to 3 seconds, but may be set to an appropriate value.

Due to Example 4, as described above, when predetermined information in the received GPS information is selectively stored in the first memory, information necessary for recording is obtained. In the case where the shutter button is depressed, when information is not complete, the sequence waits until information is complete, and makes it to be recording information. Thereby, appropriate information can be recorded in synchronization with the shutter button depressing.

When predetermined information in the received GPS information is selectively stored in the first memory, information necessary for recording is obtained. In the case where the shutter button is depressed, when this information is made to be recording information in the first memory, appropriate information can be recorded in synchronization with the shutter button depressing.

When predetermined information in the received GPS information is selectively stored in the first memory, information necessary for recording is obtained. In the case where the shutter button is depressed, when information is not complete in the first memory, the sequence waits for a predetermined time until information is complete. Then, information in the first memory is made to be recording information, and thereby, appropriate information can be recorded in synchronization with the shutter button depressing.

When predetermined information in the received GPS information is selectively stored successively in the first memory, information necessary for recording is obtained. Further, in the case where information in the first memory is stored in the third memory, even if information in the second memory is successively written in the first memory and a long period of time is required, when the shutter button is depressed, information in the third memory is made to be recording information. Thereby, appropriate information can be recorded in synchronization with the shutter button depressing.

In Examples 1–4, the recording medium is described as a film, but it may be structured such that GPS information is stored in the recording medium such as magnetic recording medium, optical magnetic recording medium, or similar mediums, together with image information.

Further, GPS information may also be written on various recording medium. In this case, the writing means may be a magnetic recording means, or optical magnetic recording means, and GPS information can be stored in another storage medium, separated from the image.

Furthermore, in the present example, an example is described, in which the content of the temporary buffer is made to be writing information when the shutter button is half-depressed, however, writing information may be determined by complete depressing of the shutter button, or by a timing signal by which another image is recorded.

What is claimed is:

1. An apparatus for recording a photographed image on a recording medium together with recording data obtained from original and subsequent information received from a satellite of a GPS (Global Positioning System), said apparatus comprising:

(a) a GPS receiver adapted to periodically receive said original and subsequent information from said satellite and to output original and subsequent position data and original and subsequent accuracy data of said position data based on said information;

(b) a first memory to store first position data and first accuracy data of said first position data based on said original information;

(c) a second memory to store subsequent position data and subsequent accuracy data of said subsequent position data based on said subsequent information outputted by said GPS receiver;

(d) a comparator for comparing said subsequent accuracy data in said second memory with said first accuracy data in the first memory;

(e) a replacing element for replacing said first position data and said first accuracy data with said subsequent position data and subsequent accuracy data when said comparator judges that said subsequent accuracy data is more accurate than said first accuracy data; and (f) a recorder for recording said first position data stored in said first memory onto said recording medium.

2. The camera of claim 1, wherein the recording records the first accuracy data stored in the first memory onto the recording medium.

3. The camera of claim 1, further comprising
   a display on which the first position data and the first accuracy data are indicated.

4. The camera of claim 1 wherein said first accuracy data different rates among a position-measuring mode, a DOP (Dilution of Precision) value, and DGPS (Differential GPS).

5. An apparatus for recording a photographed image on a recording medium together with recording data obtained from original and subsequent information received from a satellite of GPS (Global Positioning System), said apparatus comprising:

(a) a GPS receiver adapted to periodically receive said original and said subsequent information from the satellite and to output plural data having at least two components based thereon;

(b) a first memory adapted to store original plural data having at least two components to be recorded on said recording medium;

(c) a second memory adapted to store subsequent plural data outputted by said GPS receiver;

(d) a replacing element adapted to replace said original plural data in said first memory with said subsequent data in said second memory;

(e) a latching device for identifying designated data from said original plural data in the first memory and for inhibiting said replacing element from replacing said designated data; and (f) a recorder for recording said plural data stored in said first memory onto said recording medium and for indicating said designated data.

6. The apparatus of claim 5 wherein said plural data stored in said first memory is position data.

7. The apparatus of claim 6 comprising an azimuth sensor for measuring an azimuth based on earth's magnetic north.

8. An apparatus for recording a photographed image on a recording medium together with recording data obtained from information received from a satellite of GPS (Global Positioning System), said apparatus comprising:

(a) a GPS receiver adapted to periodically receive new information from said satellite and to output new GPS data including plural recording data, having at least two components, for each receipt of said new information;

(b) a second memory adapted to receive and store said new GPS data;

(c) a selector adapted to select said plural recording data from said new GPS data for each receipt of said new GPS data by said second memory;

(d) a first memory adapted to receive and store each selection of said plural recording data made by said selector;

(e) a processor adapted to judge whether said plural recording data necessary for recording exists in said first memory;

(f) a third memory adapted to receive said plural recording data from said first memory only when said processor determines that said plural recording data necessary for recording exists in said first memory and to store said plural recording data therein;

(g) a shutter adapted for actuation to conduct a photographing operation;

(h) a detector to detect whether said shutter is actuated; and (i) a recorder to record said plural recording data stored in said third memory onto said recording medium when said detector determines that said actuator shutter is actuated.

9. The camera of claim 8 wherein said plural recording data includes latitude and longitude.

10. The camera of claim 8 wherein, when said processor judges that said plural recording data necessary for recording does not exist in said first memory when said shutter is actuated, said processor continues judging and said recorder delays recording for a predetermined time period after said shutter is actuated.

11. The camera of claim 10 wherein when, said processor judges, during said predetermined time period, that said plural recording data exists in said first memory, said recorder records said plural recording data stored in said first memory onto the recording medium.

12. The apparatus of claim 10 wherein when, said processor judges, during said predetermined time period, that said plural recording data does not exist in said first memory, said recorder records said plural recording data in said third memory onto said recording medium.

* * * * *